United States Patent
Bobak et al.

(10) Patent No.: US 8,428,983 B2
(45) Date of Patent: Apr. 23, 2013

(54) FACILITATING AVAILABILITY OF INFORMATION TECHNOLOGY RESOURCES BASED ON PATTERN SYSTEM ENVIRONMENTS

(75) Inventors: Mythili K. Bobak, Lagrangeville, NY (US); Tim A. McConnell, Lexington, KY (US); Michael D. Swanson, Springfield, OR (US)

(73) Assignee: International Business Machines Corporation, Armonk, NY (US)

( * ) Notice: Subject to any disclaimer, the term of this patent is extended or adjusted under 35 U.S.C. 154(b) by 1012 days.

(21) Appl. No.: 11/965,851

(22) Filed: Dec. 28, 2007

(65) Prior Publication Data

US 2009/0171706 A1  Jul. 2, 2009

(51) Int. Cl.
*G06Q 10/00* (2012.01)
*G06Q 30/00* (2012.01)
*G06F 15/18* (2006.01)

(52) U.S. Cl.
USPC ............ 705/7.11; 705/7.29; 705/7.31

(58) Field of Classification Search ............ 705/7
See application file for complete search history.

(56) References Cited

U.S. PATENT DOCUMENTS

| | | | |
|---|---|---|---|
| 5,023,873 A | 6/1991 | Stevenson et al. ............ 371/8.2 |
| 5,386,561 A | 1/1995 | Huynh et al. | |
| 5,452,452 A | 9/1995 | Gaetner et al. | |
| 5,481,694 A | 1/1996 | Chao et al. ............ 395/439 |
| 5,537,542 A | 7/1996 | Eilert et al. | |
| 5,604,863 A | 2/1997 | Allen et al. | |
| 5,631,831 A | 5/1997 | Bird et al. | |
| 5,652,908 A | 7/1997 | Douglas et al. | |
| 5,734,837 A | 3/1998 | Flores et al. | |
| 5,790,780 A | 8/1998 | Brichta et al. | |
| 5,797,005 A | 8/1998 | Bahls et al. | |
| 5,797,129 A | 8/1998 | Rohan | |
| 5,826,080 A | 10/1998 | Dworzecki | |
| 5,887,168 A | 3/1999 | Bahls et al. | |
| 6,012,044 A | 1/2000 | Maggioncalda et al. | |
| 6,012,152 A | 1/2000 | Douik et al. | |
| 6,041,306 A | 3/2000 | Du et al. | |
| 6,336,138 B1 | 1/2002 | Caswell et al. | |
| 6,385,613 B1 | 5/2002 | Grewell et al. ............ 707/8 |
| 6,393,386 B1 | 5/2002 | Zager et al. | |

(Continued)

FOREIGN PATENT DOCUMENTS

WO  WO 99/10814  3/1999

OTHER PUBLICATIONS

Office Action for U.S. Appl. No. 11/965,862 dated Jun. 23, 2010.

(Continued)

*Primary Examiner* — Jason Dunham
*Assistant Examiner* — Venay Puri
(74) *Attorney, Agent, or Firm* — Dennis Jung, Esq.; Blanche E. Schiller, Esq.; Heslin Rothenberg Farley & Mesiti P.C.

(57) ABSTRACT

A Pattern System Environment is formed. The Pattern System Environment is a representation of information technology (IT) resources of a customer's business environment. The Pattern System Environment is based on information associated with the IT resources of the customer, and that information indicates how the IT resources are utilized during a business cycle of the customer. Pattern System Environments are usable in many environments, including those that support business resiliency.

23 Claims, 19 Drawing Sheets

U.S. PATENT DOCUMENTS

| | | | |
|---|---|---|---|
| 6,393,485 B1 | 5/2002 | Chao et al. | 709/231 |
| 6,408,277 B1 | 6/2002 | Nelken | |
| 6,449,688 B1 | 9/2002 | Peters et al. | 711/112 |
| 6,480,944 B2 | 11/2002 | Bradshaw et al. | |
| 6,625,751 B1 | 9/2003 | Starovic et al. | |
| 6,732,118 B2 | 5/2004 | Hermann et al. | |
| 6,785,768 B2 | 8/2004 | Peters et al. | 711/112 |
| 6,862,696 B1 | 3/2005 | Voas et al. | |
| 6,874,010 B1 | 3/2005 | Sargent | |
| 6,934,247 B2 | 8/2005 | Bhattal et al. | 370/216 |
| 6,954,786 B1 | 10/2005 | Vered et al. | |
| 6,983,321 B2 | 1/2006 | Trinon et al. | |
| 6,983,362 B1 * | 1/2006 | Kidder et al. | 713/1 |
| 7,032,186 B1 | 4/2006 | Gasser et al. | |
| 7,047,337 B2 | 5/2006 | Armstrong et al. | |
| 7,058,947 B1 * | 6/2006 | Raja et al. | 718/104 |
| 7,111,297 B1 | 9/2006 | Sankaranarayan et al. | |
| 7,197,749 B2 | 3/2007 | Thornton et al. | |
| 7,243,267 B2 | 7/2007 | Klemm et al. | |
| 7,313,573 B2 | 12/2007 | Leung et al. | |
| 7,325,161 B1 | 1/2008 | Rakic et al. | |
| 7,395,537 B1 | 7/2008 | Brown et al. | |
| 7,409,356 B1 | 8/2008 | Geddes et al. | |
| 7,437,611 B2 | 10/2008 | Agarwal et al. | |
| 7,490,265 B2 | 2/2009 | Baskey et al. | |
| 7,499,954 B2 | 3/2009 | Cherkauer et al. | |
| 7,509,529 B2 | 3/2009 | Colucci et al. | |
| 7,529,981 B2 * | 5/2009 | Childress et al. | 714/48 |
| 7,536,585 B1 | 5/2009 | Keeton et al. | |
| 7,568,019 B1 * | 7/2009 | Bhargava et al. | 709/223 |
| 7,587,483 B1 | 9/2009 | Florissi et al. | |
| 7,610,512 B2 | 10/2009 | Gerber | |
| 7,620,953 B1 | 11/2009 | Tene et al. | |
| 7,627,728 B1 | 12/2009 | Roeck et al. | |
| 7,650,341 B1 | 1/2010 | Oratovsky et al. | |
| 7,707,173 B2 | 4/2010 | Nanavati et al. | |
| 7,730,363 B2 | 6/2010 | Takezawa et al. | |
| 7,743,001 B1 | 6/2010 | Vermeulen et al. | |
| 7,747,730 B1 | 6/2010 | Harlow | |
| 7,752,310 B2 | 7/2010 | Kageyama | |
| 7,774,457 B1 | 8/2010 | Talwar et al. | |
| 7,774,458 B2 | 8/2010 | Trinon et al. | |
| 7,818,421 B2 | 10/2010 | Machida | |
| 7,865,582 B2 | 1/2011 | Santos et al. | |
| 7,933,872 B2 | 4/2011 | Kulkarni et al. | |
| 7,934,119 B2 | 4/2011 | Takamoto et al. | |
| 7,937,706 B2 | 5/2011 | Casotto | |
| 7,958,393 B2 | 6/2011 | Bobak et al. | |
| 7,962,590 B1 * | 6/2011 | Or et al. | 709/223 |
| 8,051,106 B2 * | 11/2011 | Bird | 707/802 |
| 8,260,893 B1 | 9/2012 | Bandhole et al. | |
| 2001/0056398 A1 | 12/2001 | Scheirer | |
| 2001/0056554 A1 | 12/2001 | Chrabaszcz | |
| 2002/0022952 A1 | 2/2002 | Zager et al. | |
| 2002/0049749 A1 | 4/2002 | Helgeson et al. | |
| 2002/0059512 A1 | 5/2002 | Desjardins | |
| 2002/0069102 A1 | 6/2002 | Vellante et al. | |
| 2002/0078130 A1 | 6/2002 | Thornton et al. | |
| 2002/0078381 A1 | 6/2002 | Farley et al. | |
| 2002/0091991 A1 | 7/2002 | Castro | |
| 2002/0194045 A1 | 12/2002 | Shay et al. | |
| 2002/0198727 A1 | 12/2002 | Ann et al. | |
| 2003/0051186 A1 * | 3/2003 | Boudnik et al. | 714/2 |
| 2003/0056013 A1 | 3/2003 | Laschkewitsch et al. | |
| 2003/0078823 A1 | 4/2003 | Yoshioka et al. | |
| 2003/0084100 A1 | 5/2003 | Gahan et al. | |
| 2003/0093672 A1 | 5/2003 | Cichowlas | |
| 2003/0135384 A1 | 7/2003 | Nguyen | |
| 2003/0139956 A1 | 7/2003 | Guenther et al. | |
| 2003/0200482 A1 | 10/2003 | Sullivan | |
| 2003/0212580 A1 | 11/2003 | Shen | |
| 2003/0212685 A1 | 11/2003 | Rakotoarivelo et al. | |
| 2003/0225602 A1 | 12/2003 | Hagmann et al. | |
| 2003/0236677 A1 | 12/2003 | Casati et al. | |
| 2004/0034553 A1 | 2/2004 | Cole et al. | |
| 2004/0054690 A1 | 3/2004 | Hillerbrand et al. | |
| 2004/0078373 A1 | 4/2004 | Ghoneimy et al. | |
| 2004/0119752 A1 | 6/2004 | Beringer et al. | |
| 2004/0143470 A1 | 7/2004 | Myrick et al. | |
| 2004/0158777 A1 | 8/2004 | Bae et al. | |
| 2004/0162741 A1 | 8/2004 | Flaxer et al. | |
| 2004/0181476 A1 | 9/2004 | Smith et al. | |
| 2004/0186905 A1 | 9/2004 | Young et al. | |
| 2004/0193476 A1 | 9/2004 | Aerdts | |
| 2004/0199768 A1 | 10/2004 | Nail | |
| 2004/0210452 A1 | 10/2004 | Aboujaoude et al. | |
| 2004/0243699 A1 | 12/2004 | Koclanes et al. | |
| 2005/0015641 A1 | 1/2005 | Alur et al. | |
| 2005/0033600 A1 | 2/2005 | Geddes et al. | |
| 2005/0043977 A1 | 2/2005 | Ahern et al. | |
| 2005/0049906 A1 | 3/2005 | Leymann et al. | |
| 2005/0060662 A1 | 3/2005 | Soares et al. | |
| 2005/0071470 A1 | 3/2005 | O'Brien et al. | |
| 2005/0086091 A1 | 4/2005 | Trumbly et al. | |
| 2005/0091351 A1 | 4/2005 | Badovinatz et al. | |
| 2005/0096949 A1 | 5/2005 | Aiber et al. | |
| 2005/0119905 A1 * | 6/2005 | Wong et al. | 705/1 |
| 2005/0125768 A1 * | 6/2005 | Wong et al. | 717/100 |
| 2005/0172306 A1 | 8/2005 | Agarwal et al. | |
| 2005/0177406 A1 | 8/2005 | Facciorusso et al. | |
| 2005/0198244 A1 | 9/2005 | Eilam et al. | |
| 2005/0228852 A1 | 10/2005 | Santos et al. | |
| 2005/0235248 A1 | 10/2005 | Victoria et al. | |
| 2005/0262242 A1 | 11/2005 | Byers et al. | |
| 2006/0004265 A1 | 1/2006 | Pulkkinen et al. | |
| 2006/0010234 A1 | 1/2006 | Reedy et al. | |
| 2006/0020866 A1 * | 1/2006 | Lo et al. | 714/741 |
| 2006/0037022 A1 * | 2/2006 | Byrd et al. | 718/104 |
| 2006/0041505 A1 | 2/2006 | Enyart | |
| 2006/0064335 A1 | 3/2006 | Goldszmidt et al. | |
| 2006/0074731 A1 | 4/2006 | Green et al. | |
| 2006/0074735 A1 | 4/2006 | Shukla et al. | |
| 2006/0074993 A1 | 4/2006 | Pulamarasetti et al. | |
| 2006/0106626 A1 | 5/2006 | Jeng et al. | |
| 2006/0111921 A1 | 5/2006 | Chang et al. | |
| 2006/0112383 A1 | 5/2006 | Chang et al. | |
| 2006/0117221 A1 | 6/2006 | Fisher et al. | |
| 2006/0123022 A1 * | 6/2006 | Bird | 707/100 |
| 2006/0129562 A1 * | 6/2006 | Pulamarasetti et al. | 707/10 |
| 2006/0149842 A1 | 7/2006 | Dawson et al. | |
| 2006/0161444 A1 | 7/2006 | Lubrecht et al. | |
| 2006/0161466 A1 | 7/2006 | Trinon et al. | |
| 2006/0179136 A1 | 8/2006 | Loboz et al. | |
| 2006/0190368 A1 | 8/2006 | Kesterman | |
| 2006/0190583 A1 | 8/2006 | Whalen | |
| 2006/0190775 A1 | 8/2006 | Aggarwal et al. | |
| 2006/0218558 A1 | 9/2006 | Torii et al. | |
| 2006/0224702 A1 | 10/2006 | Schmidt et al. | |
| 2006/0245354 A1 | 11/2006 | Gao et al. | |
| 2006/0245369 A1 | 11/2006 | Schimmelpfeng et al. | |
| 2006/0248546 A1 | 11/2006 | Andreev et al. | |
| 2006/0259526 A1 | 11/2006 | Booz et al. | |
| 2006/0287875 A1 | 12/2006 | Reddy et al. | |
| 2006/0293942 A1 | 12/2006 | Chaddha et al. | |
| 2007/0005739 A1 | 1/2007 | Sadiq et al. | |
| 2007/0011331 A1 | 1/2007 | Morimotto et al. | |
| 2007/0027734 A1 | 2/2007 | Hughes | |
| 2007/0038490 A1 | 2/2007 | Joodi | |
| 2007/0038492 A1 | 2/2007 | Ryan et al. | |
| 2007/0067296 A1 * | 3/2007 | Malloy et al. | 707/8 |
| 2007/0079097 A1 | 4/2007 | Karnowski et al. | |
| 2007/0100712 A1 | 5/2007 | Kilpatrick et al. | |
| 2007/0112847 A1 | 5/2007 | Dublish et al. | |
| 2007/0143166 A1 | 6/2007 | Leymann et al. | |
| 2007/0150571 A1 | 6/2007 | Haga et al. | |
| 2007/0165525 A1 | 7/2007 | Kageyama | |
| 2007/0179826 A1 | 8/2007 | Cutlip et al. | |
| 2007/0198678 A1 | 8/2007 | Dieberger et al. | |
| 2007/0234408 A1 | 10/2007 | Burch et al. | |
| 2007/0266029 A1 | 11/2007 | Baskey et al. | |
| 2007/0271219 A1 | 11/2007 | Agarwal et al. | |
| 2007/0276885 A1 | 11/2007 | Valiyaparambil et al. | |
| 2007/0286219 A1 | 12/2007 | Knop et al. | |
| 2007/0294406 A1 | 12/2007 | Suer et al. | |
| 2007/0300204 A1 | 12/2007 | Andreev et al. | |
| 2008/0016335 A1 | 1/2008 | Takahashi et al. | |
| 2008/0052719 A1 | 2/2008 | Briscoe et al. | |

| | | |
|---|---|---|
| 2008/0063423 A1 | 3/2008 | Matoba |
| 2008/0140495 A1 | 6/2008 | Bhamidipaty et al. |
| 2008/0215909 A1 | 9/2008 | Bretschneider et al. |
| 2008/0294777 A1 | 11/2008 | Karve et al. |
| 2008/0295100 A1 | 11/2008 | Ainsworth |
| 2008/0317217 A1 | 12/2008 | Bernardini et al. |
| 2009/0037363 A1 | 2/2009 | Kozlov et al. |
| 2009/0077210 A1 | 3/2009 | Musman et al. |
| 2009/0125751 A1 | 5/2009 | Dawson et al. |
| 2009/0150456 A1 | 6/2009 | Balasubramanian et al. |
| 2009/0150887 A1 | 6/2009 | Sanghvi et al. |
| 2009/0171703 A1 | 7/2009 | Bobak et al. |
| 2009/0171704 A1 | 7/2009 | Bobak et al. |
| 2009/0171705 A1 | 7/2009 | Bobak et al. |
| 2009/0171707 A1 | 7/2009 | Bobak et al. |
| 2009/0171708 A1 | 7/2009 | Bobak et al. |
| 2009/0171730 A1 | 7/2009 | Bobak et al. |
| 2009/0171731 A1 | 7/2009 | Bobak et al. |
| 2009/0171732 A1 | 7/2009 | Bobak et al. |
| 2009/0171733 A1 | 7/2009 | Bobak et al. |
| 2009/0172149 A1 | 7/2009 | Bobak et al. |
| 2009/0172460 A1 | 7/2009 | Bobak et al. |
| 2009/0172461 A1 | 7/2009 | Bobak et al. |
| 2009/0172470 A1 | 7/2009 | Bobak et al. |
| 2009/0172668 A1 | 7/2009 | Bobak et al. |
| 2009/0172669 A1 | 7/2009 | Bobak et al. |
| 2009/0172670 A1 | 7/2009 | Bobak et al. |
| 2009/0172671 A1 | 7/2009 | Bobak et al. |
| 2009/0172674 A1 | 7/2009 | Bobak et al. |
| 2009/0172682 A1 | 7/2009 | Bobak et al. |
| 2009/0172687 A1 | 7/2009 | Bobak et al. |
| 2009/0172688 A1 | 7/2009 | Bobak et al. |
| 2009/0172689 A1 | 7/2009 | Bobak et al. |
| 2009/0172740 A1 | 7/2009 | Corl |
| 2009/0172769 A1 | 7/2009 | Bobak et al. |
| 2009/0249337 A1 | 10/2009 | Vasilevsky et al. |
| 2010/0280863 A1 | 11/2010 | Wilcock et al. |
| 2011/0004564 A1 | 1/2011 | Rolia et al. |

OTHER PUBLICATIONS

Final Office Action for U.S. Appl. No. 11/966,495 dated May 14, 2010.
Office Action for U.S. Appl. No. 11/965,872 dated Jul. 6, 2010.
Office Action for U.S. Appl. No. 11/966,495 dated Oct. 29, 2009.
Office Action for U.S. Appl. No. 11/965,874 dated Mar. 18, 2010.
Office Action for U.S. Appl. No. 11/965,897 dated Mar. 31, 2010.
Office Action for U.S. Appl. No. 11/965,930 dated Apr. 1, 2010.
Evans, James, "Optimization Algorithms for Networks and Graphs, Second Edition", 1992, CCR, ISBN 0824786025, Chapters 1-3 (pp. 1-76) and Chapter 11 (pp. 390-413).
Jolliffe, Ian T., "Principal Component Analysis", 2002, Pringer, ISBN 0387954422, Chapters 1-4 (pp. 1-77), Chapters 6-7 (pp. 111-166) and Chapters 12-14 (pp. 299-405).
Lau, Hang T., "A Java Library of Graph Algorithms and Optimization Discrete Mathematics and Its Applications," 2006, Chapman & Hall, ISBN 1584887184, Chapter 2.2 (pp. 39-43).
Horstmann, Cay S. et al., Core Java 2—vol. II—Advanced Features (7th Edition), Sun Microsystems Press, 2005, ISBN 0131118269, Chapter 1 (pp. 1-22).
"Parasoft BPEL Maestro," http://www.parasoft.com/jsp/products/home.jsp?product=BPEL.
Final Office Action for U.S. Appl. No. 11/965,930 dated Sep. 29, 2010.
Final Office Action for U.S. Appl. No. 11/965,874 dated Oct. 14, 2010.
Office Action for U.S. Appl. No. 11/965,862 dated Dec. 7, 2010.
Final Office Action for U.S. Appl. No. 11/965,855 dated Dec. 22, 2010.
Office Action for U.S. Appl. No. 11/965,832 dated Dec. 22, 2010.
Final Office Action for U.S. Appl. No. 11/965,872 dated Dec. 22, 2010.
Patent Application for U.S. Appl. No. 12/975,520, filed Dec. 22, 2010 entitled "Real-Time Information Technology Environments".
Office Action for U.S. Appl. No. 11/965,855 dated Apr. 30, 2010.
Bolie et al., "BPEL Cookbook: Best Practices for SOA-based Integration and Composite Applications Development", 2006, Packt Publishing, ISBN 1904811337; Chapter 1; 12 pages.
Juric, et al., Business Process Execution Language for Web Services—An Architect and Developer's Guide to Orchestrating Web Services Using BPEL4WS, Second Edition; 2006; Packt Publishing; ISBN 1904811817; Chapter 5; 28 pages.
Horstman et al., Core Java 2: vol. I—Fundamentals (7th Edition); Core Series; 2003; Sun Microsystems, Inc., ISBN 0131472025; pp. 324-327.
Perry, J. Steven, "Java Management Extension: 1st Edition," Jun. 15, 2002; O'Reilly & Associates, Inc.; ISBN 0596002459; Chapter 1 (pp. 1-32) and Chapter 7 (pp. 207-222).
Weerawarana et al., "Web Services Platform Architecture: SOAP, WSDL, WS-Policy, WS-Addressing, WS-BPEL, WS-Reliable Messaging, and More," 2005; Pearson Education, Inc.; ISBN 0131488740; Chapter 14 (pp. 313-340).
Van Bon, Jan, "Foundations of IT Service Management Based on ITIL," Sep. 2005; Van Haren Publishing; ISBN 9077212582; Chapter 6 (pp. 69-85).
Kreger et al., "JAVA and JMX—Building Manageable Systems," Jan. 2003; ISBN 0672324083; pp. 54-64.
Final Office Action for U.S. Appl. No. 11/965,897 dated Sep. 17, 2010.
"BPEL Project", http://www.eclipse.org/bpel/.
"Factor Analysis Using SAS PROC FACTOR", http://www.utexas.edu/cc/docs/stat53.html.
"Principal Components and Factor Analysis", http://statsoft.com/textbook/stfacan.html.
"WebSphere Intergration Developer", http://www-306.ibm.com/software/integration/wid/about/?S_CMP=rnav.
Final Office Action for U.S. Appl. No. 11/965,922 dated Jul. 29, 2011.
Office Action for U.S. Appl. No. 11/965,845 dated Jul. 29, 2011.
Office Action for U.S. Appl. No. 11/965,832 dated Aug. 23, 2011.
Office Action for U.S. Appl. No. 11/965,902 dated Aug. 23, 2011.
Final Office Action for U.S. Appl. No. 11/965,838 dated Aug. 19, 2011.
Final Office Action for U.S. Appl. No. 11/965,913 dated Aug. 17, 2011.
Office Action for U.S. Appl. No. 11/965,894 dated Jul. 18, 2011.
Office Action for U.S. Appl. No. 11/966,619 dated Feb. 2, 2011.
Office Action for U.S. Appl. No. 11/965,926 dated Feb. 3, 2011.
Rood, Melody A., "Enterprise Architecture: Definition, Content & Utility," IEEE, Jul. 1994, pp. 106-111.
Buchanan, Richard D., et al., "Aligning Enterprise and IT Investments with Corporate Goals," OMG White Paper, 2002, p. 1-13 (cited by Examiner in Office Action for U.S. Appl. No. 11/965,926—no further date information available.).
Restriction Requirement for U.S. Appl. No. 11/965,889 dated Feb. 16, 2011.
Office Action for U.S. Appl. No. 11/965,913 dated Mar. 1, 2011.
Office Action for U.S. Appl. No. 11/965,845 dated Mar. 11, 2011.
Liu, Rong et al., "Modeling Business Contexture and Behavior Using Business Artifacts," Lecture Notes in Computer Science, 2007, vol. 4495/2007, pp. 324-339 (cited by Examiner in Office Action for U.S. Appl. No. 11/965,845—no further date information available.).
Office Action for U.S. Appl. No. 11/965,922 dated Mar. 16, 2011.
Final Office Action for U.S. Appl. No. 11/965,832 dated May 12, 2011.
Office Action for U.S. Appl. No. 11/965,855 dated Oct. 3, 2011.
Office Action for U.S. Appl. No. 11/965,951 dated Oct. 5, 2011.
Final Office Action for U.S. Appl. No. 11/965,877 dated Nov. 8, 2011.
Final Office Action for U.S. Appl. No. 11/965,899 dated Nov. 22, 2011.
Final Office Action for U.S. Appl. No. 11/965,917 dated Dec. 21, 2011.
Final Office Action for U.S. Appl. No. 11/965,902 dated Dec. 21, 2011.
Final Office Action for U.S. Appl. No. 11/965,894 dated Dec. 27, 2011.
Final Office Action for U.S. Appl. No. 11/965,832 dated Jan. 9, 2012.

Final Office Action for U.S. Appl. No. 11/965,889 dated Jan. 11, 2012.
Office Action for U.S. Appl. No. 11/965,978 dated Jun. 22, 2011.
Office Action for U.S. Appl. No. 11/965,889 dated May 25, 2011.
Final Office Action for U.S. Appl. No. 11/966,619 dated Jun. 15, 2011.
Office Action for U.S. Appl. No. 11/965,899 dated Jun. 20, 2011.
Office Action for U.S. Appl. No. 11/965,877 dated Jun. 20, 2011.
Office Action for U.S. Appl. No. 11/965,862 dated Jul. 8, 2011.
Office Action for U.S. Appl. No. 11/965,917 dated Jul. 11, 2011.
Final Office Action for U.S. Appl. No. 11/965,926 dated Jul. 19, 2011.
Office Action for U.S. Appl. No. 11/966,495 dated Feb. 1, 2012.
Final Office Action for U.S. Appl. No. 11/965,862 dated Feb. 14, 2012.
Office Action for U.S. Appl. No. 11/965,872 dated Feb. 16, 2012.
Final Office Action for U.S. Appl. No. 11/965,951 dated Feb. 22, 2012.
Office Action for U.S. Appl. No. 11/965,926 dated Mar. 2, 2012.
Office Action for U.S. Appl. No. 11/965,874 dated Mar. 19, 2012.
Office Action for U.S. Appl. No. 11/965,845 dated Apr. 18, 2012.
Office Action for U.S. Appl. No. 11/965,922 dated Apr. 20, 2012.
Crawford, C. H. et al., "Toward an On Demand Service-Oriented Architecture," IBM Systems Journal, vol. 44, No. 1, 2005, pp. 81-107.
Office Action for U.S. Appl. No. 11/965,894 dated Jun. 13, 2012.
Final Office Action for U.S. Appl. No. 11/965,889 dated Jun. 20, 2012.
Office Action for U.S. Appl. No. 11/965,902 dated Jul. 5, 2012.
Office Action for U.S. Appl. No. 12/975,520 dated Jul. 18, 2012.
Final Office Action for U.S. Appl. No. 11/965,906 dated Jul. 23, 2012.
Final Office Action for U.S. Appl. No. 11/965,894 dated Oct. 23, 2012.
Office Action for U.S. Appl. No. 11/965,862 dated Sep. 26, 2012.
Final Office Action for U.S. Appl. No. 11/965,926 dated Oct. 5, 2012.
Kramer, Jeff et al., "The Evolving Philosophers Problem: Dynamic Change Management," Aug. 1991, pp. 1-33.
Final Office Action for U.S. Appl. No. 11/965,922 dated Aug. 28, 2012.
Office Action for U.S. Appl. No. 11/965,899 dated Aug. 28, 2012.
Final Office Action for U.S. Appl. No. 11/965,845 dated Aug. 29, 2012.

* cited by examiner

FIG. 6A

| MESSAGE | RESOURCE | DATE |
|---|---|---|
| i CONTAINMENT REGION HAS RECOVERED | CONTAINMENT1 | APR 18, 2006 10:50:52.193 |
| X CONTAINMENT REGION CREATED FOR RESOURCE FAILURE | CONTAINMENT1 | APR 18, 2006 10:50:52.103 |
| i CONTAINMENT REGION HAS RECOVERED | CONTAINMENT3 | APR 18, 2006 10:50:51.982 |
| X DETECTED DYNAMIC MEMBERSHIP CHANGE: ACTIVE POLICY REED... | RECOVERYSEGMENT2 | APR 18, 2006 10:12:25.696 |
| X THIS RESOURCE HAS ENTERED AN UNRECOVERABLE STATE AND REQ... | RECOVERY MANAGER2 | APR 18, 2006 10:12:25.696 |
| X THIS RESOURCE HAS ENTERED AN UNRECOVERABLE STATE AND REQ... | RECOVERY MANAGER1 | APR 18, 2006 10:12:14.770 |
| X ACTIVATION OF POLICY XYZ HAS FAILED | RECOVERY SEGMENT1 | APR 18, 2006 10:12:14.760 |
| i DETECTED DYNAMIC MEMBERSHIP CHANGE ACTIVE POLICY REED | RECOVERY SEGMENT2 | APR 18, 2006 10:10:25.696 |

THE RESOURCE "CODER 1 RECOVERY" HAS ENTERED AN UNRECOVERABLE STATE THAT REQUIRES YOUR INPUT. DO YOU WANT TO OPEN THE RESOURCE NOW?

[YES] [NO]

650

FACILITATING AVAILABILITY OF INFORMATION TECHNOLOGY RESOURCES BASED ON PATTERN SYSTEM ENVIRONMENTS

TECHNICAL FIELD

This invention relates, in general, to managing customer environments to provide support for business applications, and in particular, to automatically providing a pattern system environment that characterizes the customer environment and supports business resiliency.

BACKGROUND OF THE INVENTION

Today, customers attempt to manually manage and align their availability management with their information-technology (IT) infrastructure. Changes in either business needs or the underlying infrastructure are often not captured in a timely manner and require considerable rework, leading to an inflexible environment.

Often high-availability solutions and disaster-recovery technologies are handled via a number of disparate point products that target specific scopes of failure, platforms or applications. Integrating these solutions into an end-to-end solution is a complex task left to the customer, with results being either proprietary and very specific, or unsuccessful.

Customers do not have the tools and infrastructure in place to customize their availability-management infrastructure to respond to failures in a way that allows for a more graceful degradation of their environments. As a result, more drastic and costly actions may be taken (such as a site switch) when other options (such as disabling a set of applications or users) could have been offered, depending on business needs.

Coordination across availability management and other systems-management disciplines is either nonexistent or accomplished via non-reusable, proprietary, custom technology.

There is little predictability as to whether the desired recovery objective will be achieved, prior to time of failure. There are only manual, labor-intensive techniques to connect recovery actions with the business impact of failures and degradations.

Any change in the underlying application, technologies, business recovery objectives, resources or their interrelationships require a manual assessment of impact to the handcrafted recovery scheme.

SUMMARY OF THE INVENTION

Based on the foregoing, a need exists for a capability that automatically manages and aligns a customer's environment (e.g., for availability) with its information technology (IT) infrastructure. In particular, a need exists for a representation, automatically formed, of the IT resources of a customer's business environment, in which the representation is based on information relating to how IT resources are utilized during a customer's business cycle.

The shortcomings of the prior art are overcome and additional advantages are provided through the provision of a method of facilitating management of customer environments. The method includes, for instance, obtaining information associated with one or more information technology (IT) resources of a customer, wherein the information indicates how the one or more IT resources are utilized during a business cycle of the customer; and automatically forming a pattern system environment (PSE) based on the obtained information, wherein the pattern system environment is a representation of the IT resources of the customer's business environment.

Computer program products and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts one example of a notification view indicating a plurality of notifications, in accordance with an aspect of the present invention;

FIG. 6B depicts one example of a notification message sent to a user, in accordance with an aspect of the present invention;

DETAILED DESCRIPTION OF THE INVENTION

Figure 1:
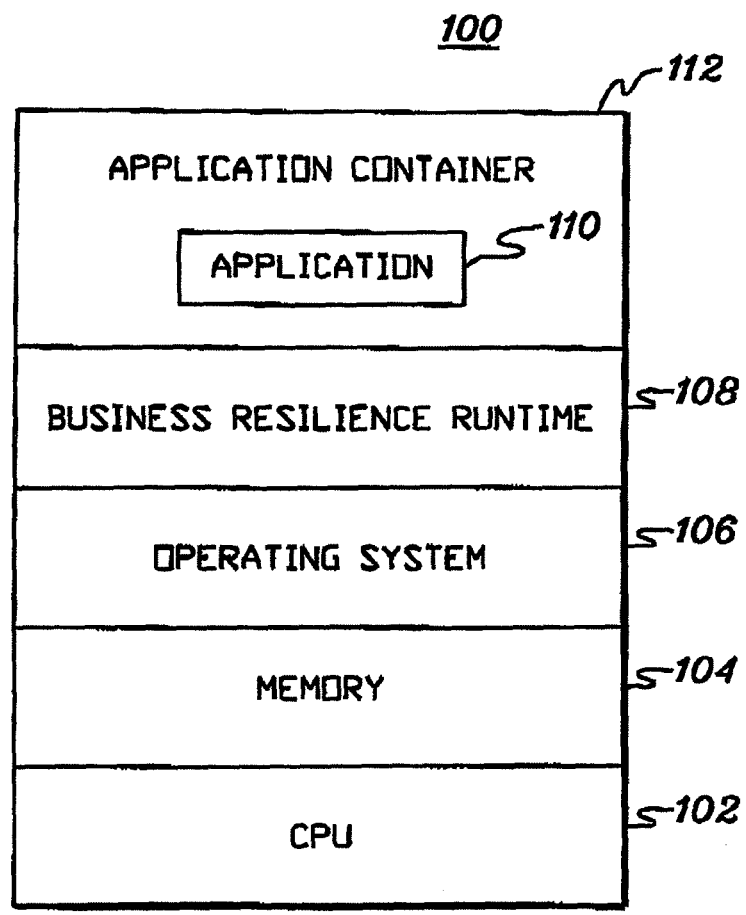
FIG. 1 depicts one embodiment of a processing environment to incorporate and use one or more aspects of the present invention.

In managing a customer's environment, such as its business environment, there is a set of requirements unaddressed by existing technology, which causes unpredictable down time, large-impact failures and recoveries, and significant extra labor cost, with resulting loss of business revenue. These requirements include, for instance:

1. Ensuring that there is a consistent recovery scheme across the environment, linked to the business application, across the different types of resources; not a different methodology performed by platform silo. The recovery is to match the scope of the business application, not limited in scope to a single platform. The recovery is to be end to end and allow for interaction across multiple vendor products. In one example, a business application is defined as a process that is supported by IT services. It is supportive of the products and/or services created by a customer. It can be of fine granularity (e.g., a specific service/product provided) or of coarse granularity (e.g., a group of services/products provided).
2. Ability to group together mixed resource types (servers, storage, applications, subsystems, network, etc.) into logical groupings aligned with business processes requirements for availability.
3. Ability to share resources across logical groups of resources; ability to nest these logical group definitions, with specifications for goal policy accepted and implemented at each level.
4. Pre-specified recommendations for resource groupings, with customization possible, and pattern matching customer configuration with vendor or customer provided groupings/relationships—to avoid requiring customers to start from scratch for definitions.
5. Ability to group together redundant resources with functional equivalence—use during validation when customer has less redundancy than required to meet the Recovery Time Objective (RTO) goal; in recovery to select an alternate resource for one that has failed.
6. Ability to configure the definition of what constitutes available, degraded, or unavailable based on customer's own sensitivity for a given grouping of resources, and business needs, and further aggregate the state across various resources to produce an overall state for the business application. The state is to be assessed real time, based on what is actually occurring in the system at the time, rather than fixed definitions. In some cases, a performance slowdown might flag a degraded environment, and in other cases, a failure may be necessary before flagging a degraded or unavailable environment. The definitions of available, degraded and unavailable are to be consumed by an availability system that evaluates them in the context of a policy, and then determines appropriate action, including possibly launching recovery automatically.
7. Ability to relate the redundancy capability of relevant resources to the availability status of a business application.
8. Allow customers to configure when recovery actions can be delegated to lower-level resources, particularly since resource sharing is becoming more relevant in many customer environments.
9. Include customer or vendor best practices for availability as prespecified workflows, expressed in a standards-based manner, that can be customized.
10. Ability to specify quantitative business goals for the recovery of logical groupings of resources, affecting both how the resources are pre-configured for recovery, as well as recovered during errors. One such quantitative goal is Recovery Time Objective (RTO). As part of the specification of quantitative business goals, to be able to include time bias of applications, and facilitate the encoding of appropriate regulatory requirements for handling of certain workloads during changing business cycles in selected businesses, such as financial services.
11. Decomposition of the overall quantified RTO goal to nested logical groups; processing for shared groups having different goals.
12. Ability to configure redundancy groupings and co-location requirements with resources from other vendors, using a representation for resources (which may be, for example, standards based), with ability to clearly identify the vendor as part of the resource definition.
13. Ability to use customer's own historical system measures to automatically generate various system environments, then use these system environments when specifying quantitative recovery goals (since recovery time achievability and requirements are not consistent across time of day, business cycle, etc.). The function is to be able to incorporate historical information from dependent resources, as part of the automatic generation of system environments.
14. Specification of statistical thresholds for acceptability of using historical information; customer specification directly of expected operation times and directive to use customer specified values.
15. Environments are matched to IT operations and time of day, with automatic processing under a new system environment at time boundaries—no automatic internal adjustment of RTO is to be allowed, rather changed if the customer has specified that a different RTO is needed for different system environments.
16. Goal Validation—Prior to failure time. Ability to see assessment of achievable recovery time, in, for instance, a Gantt chart like manner, detailing what is achievable for each resource and taking into account overlaps of recovery sequences, and differentiating by system environment. Specific use can be during risk assessments, management requests for additional recovery related resources, mitigation plans for where there are potentials for RTO miss. Example customer questions:

What is my expected recovery time for a given application during "end of month close" system environment?
What is the longest component of that recovery time?
Can I expect to achieve the desired RTO during the "market open" for stock exchange or financial services applications?
What would be the optimal sequence and parallelization of recovery for the resources used by my business application?

17. Ability to prepare the environment to meet the desired quantitative business goals, allowing for tradeoffs when shared resources are involved. Ensure that both automated and non-automated tasks can be incorporated into the pre-conditioning. Example of customer question: What would I need to do for pre-conditioning my system to support the RTO goal I need to achieve for this business application?

18. Ability to incorporate operations from any vendors' resources for pre-conditioning or recovery workflows, including specification of which pre-conditioning operations have effect on recoveries, which operations have dependencies on others, either within vendor resources or across resources from multiple vendors.
19. Customer ability to modify pre-conditioning workflows, consistent with supported operations on resources.
20. Ability to undo pre-conditioning actions taken, when there is a failure to complete a transactionally consistent set of pre-conditioning actions; recognize the failure, show customers the optional workflow to undo the actions taken, allow them to decide preferred technique for reacting to the failure—manual intervention, running undo set of operations, combination of both, etc.
21. Ability to divide pre-conditioning work between long running and immediate, nondisruptive short term actions.
22. Impact only the smallest set of resources required during recovery, to avoid negative residual or side effects for attempting to recover a broader set of resources than what is actually impacted by the failure.
23. Choosing recovery operations based on determination of which recovery actions address the minimal impact, to meet goal, and then prepare for subsequent escalation in event of failure of initial recovery actions.
24. Choosing a target for applications and operating systems (OS), based on customer co-location specifications, redundancy groups, and realtime system state.
25. Ability for customer to indicate specific effect that recovery of a given business process can have on another business process—to avoid situations where lower priority workloads are recovered causing disruption to higher priority workloads; handling situations where resources are shared.
26. Ability to prioritize ongoing recovery processing over configuration changes to an availability system, and over any other administration functions required for the availability system.
27. Ability for recoveries and pre-conditioning actions to run as entire transactions so that partial results are appropriately accounted for and backed out or compensated, based on actual effect (e.g., during recovery time or even pre-conditioning, not all actions may succeed, so need to preserve a consistent environment).
28. Allow for possible non-responsive resources or underlying infrastructure that does not have known maximum delays in response time in determining recovery actions, while not going beyond the allotted recovery time.
29. Allow customer to change quantified business recovery goals/targets without disruption to the existing recovery capability, with appropriate labeling of version of the policy to facilitate interaction with change management systems.
30. Allow customers to change logical groupings of resources that have assigned recovery goals, without disruption to the existing recovery capability, with changes versioned to facilitate interaction with change management systems.
31. Ability to specify customizable human tasks, with time specifications that can be incorporated into the goal achievement validation so customers can understand the full time involved for a recovery and where focusing on IT and people time is critical to reducing RTO.
32. There is a requirement/desire to implement dynamically modified redundancy groupings for those resources which are high volume—automatic inclusion based on a specified set of characteristics and a matching criteria.
33. There is a requirement/desire to automatically add/delete resources from the logical resource groupings for sets of resources that are not needing individual assessment.

The above set of requirements is addressed, however, by a Business Resiliency (BR) Management System, of which one or more aspects of the present invention are included. The Business Resiliency Management System provides, for instance:

1. Rapid identification of fault scope.
   Correlation and identification of dependencies between business functions and the supporting IT resources.
   Impact analysis of failures affecting business functions, across resources used within the business functions, including the applications and data.
   Isolation of failure scope to smallest set of resources, to ensure that any disruptive recovery actions effect only the necessary resources.
2. Rapid granular and graceful degradation of IT service.
   Discontinuation of services based on business priorities.
   Selection of alternate resources at various levels may include selection of hardware, application software, data, etc.
   Notifications to allow applications to tailor or reduce service consumption during times of availability constraints.
3. Integration of availability management with normal business operations and other core business processes.
   Policy controls for availability and planned reconfiguration, aligned with business objectives.
   Encapsulation, integration of isolated point solutions into availability IT fabric, through identification of affected resources and operations initiated by the solutions, as well as business resiliency.
   Goal based policy support, associated with Recovery Segments that may be overlapped or nested in scope.
   Derivation of data currency requirements, based on business availability goals.

One goal of the BR system is to allow customers to align their supporting information technology systems with their business goals for handling failures of various scopes, and to offer a continuum of recovery services from finer grained process failures to broader scoped site outages. The BR system is built around the idea of identifying the components that constitute a business function, and identifying successive levels of recovery that lead to more complex constructs as the solution evolves. The various recovery options are connected by an overall BR management capability that is driven by policy controls.

Various characteristics of one embodiment of a BR system include:

1. Capability for dynamic generation of recovery actions, into a programmatic and manageable entity.
2. Dynamic generation of configuration changes required/desired to support a customer defined Recovery Time Objective (RTO) goal.
3. Dynamic definition of key Pattern System Environments (PSEs) through statistical analysis of historical observations.
4. Validation of whether requested RTO goals are achievable, based on observed historical snapshots of outages or customer specified recovery operation time duration, in the context of key Pattern System Environments.

5. BR system dynamic, automatic generation and use of standards based Business Process Execution Language (BPEL) workflows to specify recovery transactions and allow for customer integration through workflow authoring tools.
6. Ability to configure customized scopes of recovery, based on topologies of resources and their relationships, called Recovery Segments (RSs).
7. Best practice workflows for configuration and recovery, including, but not limited to, those for different resource types: servers, storage, network, and middleware, as examples.
8. Ability to customize the definition of available, degraded, unavailable states for Recovery Segments.
9. Ability to represent customers' recommended configurations via best practice templates.
10. Ability to define the impact that recovery of one business application is allowed to have on other business applications.
11. Ability to correlate errors from the same or multiple resources into related outages and perform root cause analysis prior to initiating recovery actions.
12. Quantified policy driven, goal oriented management of unplanned outages.
13. Groupings of IT resources that have associated, consistent recovery policy and recovery actions, classified as Recovery Segments.
14. Handling of situations where the underlying error detection and notifications system itself is unavailable.

A Business Resilience System is capable of being incorporated in and used by many types of environments. One example of a processing environment to incorporate and use aspects of a BR system, including one or more aspects of the present invention, is described with reference to FIG. 1.

Processing environment 100 includes, for instance, a central processing unit (CPU) 102 coupled to memory 104 and executing an operating system 106. Examples of operating systems include AIX® and z/OS®, offered by International Business Machines Corporation; Linux; etc. AIX® and z/OS® are registered trademarks of International Business Machines Corporation, Armonk, N.Y., U.S.A. Other names used herein may be registered trademarks, trademarks or product names of International Business Machines Corporation or other companies.

The operating system manages execution of a Business Resilience Runtime Component 108 of a Business Resilience System, described herein, and one or more applications 110 of an application container 112.

As examples, processing environment 100 includes an IBM® System z™ processor or a pSeries® server offered by International Business Machines Corporation; a Linux server; or other servers, processors, etc. Processing environment 100 may include more, less and/or different components than described herein. (pSeries® is a registered trademark of International Business Machines Corporation, Armonk, N.Y., USA.)

Figure 2:
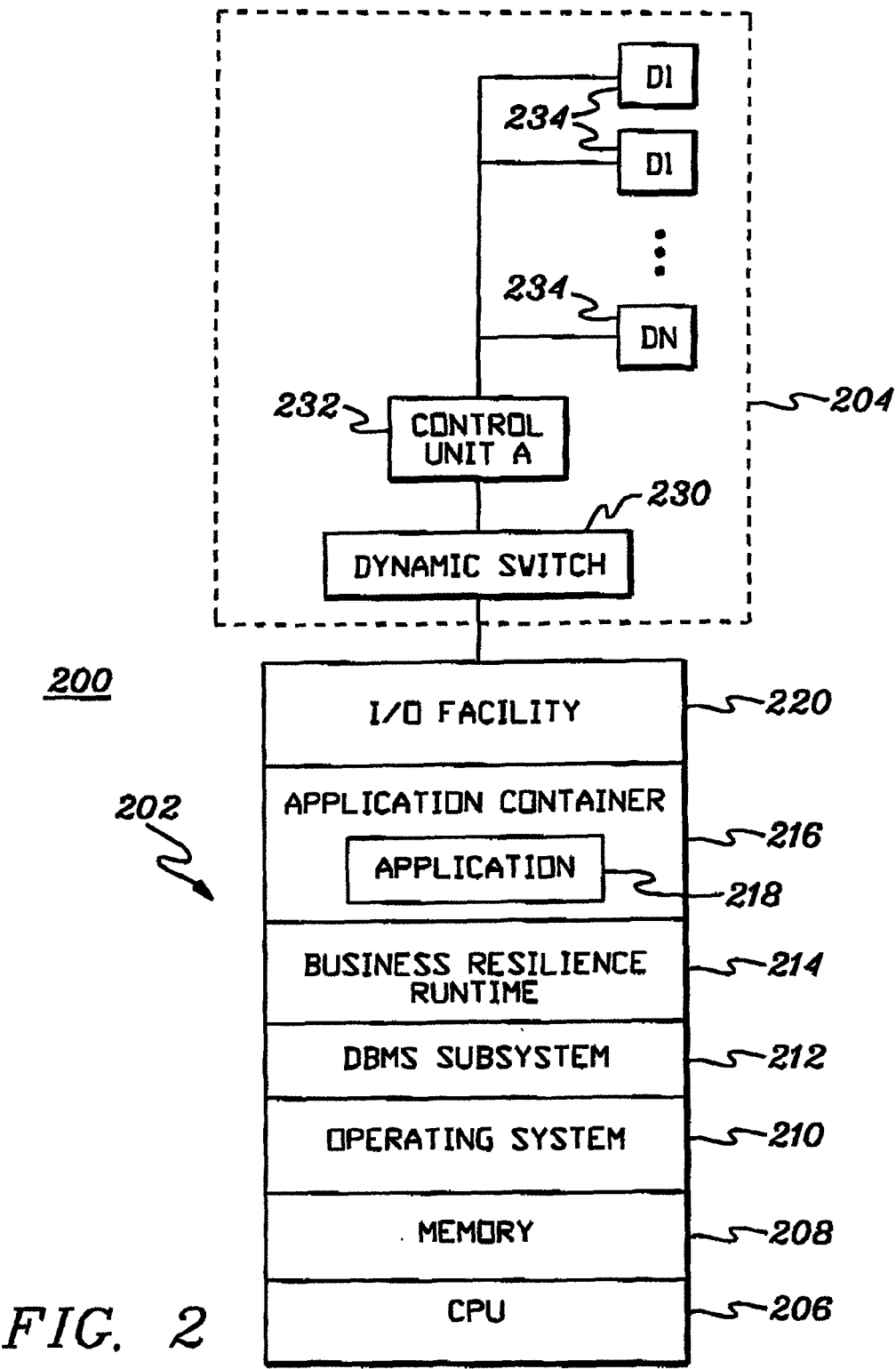
FIG. 2 depicts another embodiment of a processing environment to incorporate and use one or more aspects of the present invention.

Another example of a processing environment to incorporate and use aspects of a BR System, including one or more aspects of the present invention, is described with reference to FIG. 2.

As shown, a processing environment 200 includes for instance, a central processing complex 202 coupled to an input/output (I/O) subsystem 204. Central processing complex 202 includes, for instance, a central processing unit 206, memory 208, an operating system 210, a database management system 212, a Business Resilience Runtime Component 214, an application container 216 including one or more applications 218, and an I/O facility 220.

I/O facility 220 couples central processing complex 202 to I/O subsystem 204 via, for example, a dynamic switch 230. Dynamic switch 230 is coupled to a control unit 232, which is further coupled to one or more I/O devices 234, such as one or more direct access storage devices (DASD).

Processing environments 100 and/or 200 may include, in other embodiments, more, less and/or different components.

Figure 3:
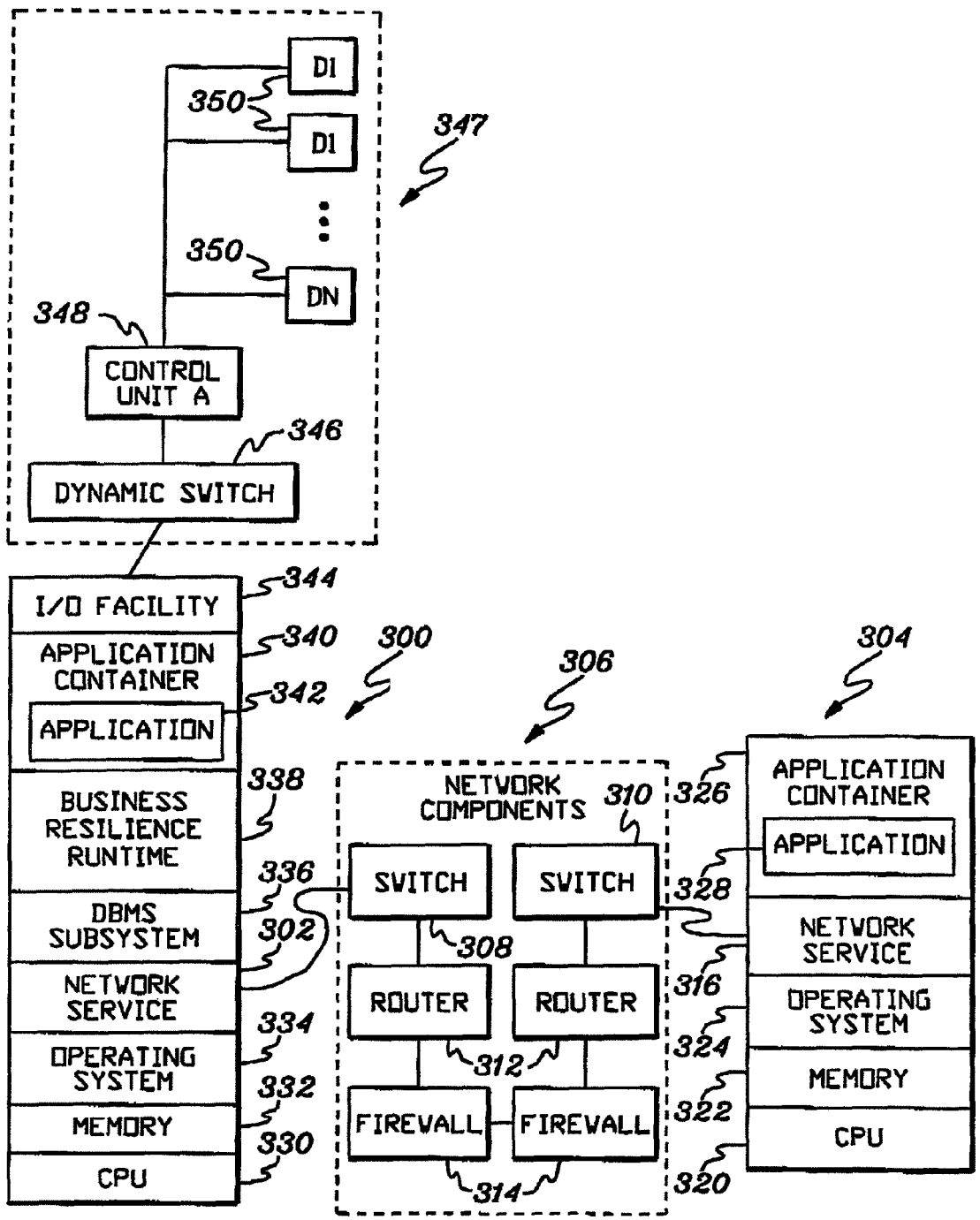
FIG. 3 depicts yet a further embodiment of a processing environment to incorporate and use one or more aspects of the present invention.

In yet another embodiment, a central processing complex 300 (FIG. 3) further includes a network service 302, which is used to couple a central processing complex 300 to a processing environment 304 via a network subsystem 306.

For example, network service 302 of central processing complex 300 is coupled to a switch 308 of network subsystem 306. Switch 308 is coupled to a switch 310 via routers 312 and firewalls 314. Switch 310 is further coupled to a network service 316 of processing environment 304.

Processing environment 304 further includes, for instance, a central processing unit 320, a memory 322, an operating system 324, and an application container 326 including one or more applications 328. In other embodiments, it can include more, less and/or different components.

Moreover, CPC 300 further includes, in one embodiment, a central processing unit 330, a memory 332, an operating system 334, a database management system 336, a Business Resilience Runtime Component 338, an application container 340 including one or more applications 342, and an I/O facility 344. It also may include more, less and/or different components.

I/O facility 344 is coupled to a dynamic switch 346 of an I/O subsystem 347. Dynamic switch 346 is further coupled to a control unit 348, which is coupled to one or more I/O devices 350.

Although examples of various environments are provided herein, these are only examples. Many variations to the above environments are possible and are considered within the scope of the present invention.

In the above-described environments, a Business Resilience Runtime Component of a Business Resilience System is included. Further details associated with a Business Resilience Runtime Component and a Business Resilience System are described with reference to FIG. 4.

In one example, a Business Resilience System 400 is a component that represents the management of recovery operations and configurations across an IT environment. Within that Business Resilience System, there is a Business Resilience Runtime Component (402) that represents the management functionality across multiple distinct Recovery Segments, and provides the service level automation and the support of creation of the recovery sequences. In addition, there are user interface (404), administration (406), installation (408) and configuration template (410) components within the Business Resilience System that enable the administrative operations that are to be performed. Each of these components is described in further detail below.

Business Resilience Runtime Component 402 includes a plurality of components of the BR System that are directly responsible for the collection of observations, creation of PSEs, policy acceptance, validation, error detection, and formulation of recovery sequences. As one example, Business Resilience Runtime Component 402 includes the following components:
 1. One or more Business Resilience Managers (BRM) (412).
  The Business Resilience Manager (BRM) is the primary component containing logic to detect potential errors in the IT environment, perform assessment to find resources causing errors, and formulate recovery sequences to reestablish the desired state for resources for all Recovery Segments that may be impacted.

The Business Resilience Manager is a component of which there can be one or more. It manages a set of Recovery Segments, and has primary responsibility to formulate recovery sequences. The association of which Recovery Segments are managed by a given BRM is determined at deployment time by the customer, with the help of deployment time templates. BRMs are primarily responsible for operations that relate to error handling and recovery workflow generation, and cross RS interaction.

2. One or more Recovery Segments (RS) (414).

Recovery Segments are customer-defined groupings of IT resources to which consistent availability policy is assigned. In other words, a Recovery Segment acts as a context within which resource recovery is performed. In many cases, Recovery Segments are compositions of IT resources that constitute logical entities, such as a middleware and its related physical resources, or an "application" and its related components.

There is no presumed granularity of a Recovery Segment. Customers can choose to specify fine-grained Recovery Segments, such as one for a given operating system, or a coarser grained Recovery Segment associated with a business process and its component parts, or even a site, as examples.

Relationships between IT resources associated with a RS are those which are part of the IT topology.

Recovery Segments can be nested or overlapped. In case of overlapping Recovery Segments, there can be policy associated with each RS, and during policy validation, conflicting definitions are reconciled. Runtime assessment is also used for policy tradeoff.

The Recovery Segment has operations which support policy expression, validation, decomposition, and assessment of state.

The number of Recovery Segments supported by a BR System can vary, depending on customer configurations and business needs.

One BRM can manage multiple Recovery Segments, but a given RS is managed by a single BRM. Further, Recovery Segments that share resources, or are subset/superset of other Recovery Segments are managed by the same BRM, in this example. Multiple BRMs can exist in the environment, depending on performance, availability, and/or maintainability characteristics.

3. Pattern System Environments (PSEs) (416).

Pattern System Environments (PSEs) are representations of a customer's environment. Sets of observations are clustered together using available mathematical tooling to generate the PSEs. In one embodiment, the generation of a PSE is automatic. A PSE is associated with a given RS, but a PSE may include information that crosses RSs.

As one example, the representation is programmatic in that it is contained within a structure from which information can be added/extracted.

4. Quantified Recovery Goal (418).

A quantified recovery goal, such as a Recovery Time Objective (RTO), is specified for each Recovery Segment that a customer creates. If customers have multiple Pattern System Environments (PSEs), a unique RTO for each PSE associated with the RS may be specified.

5. Containment Region (CR) (420).

Containment Region(s) are components of the BR System which are used at runtime to reflect the scope and impact of an outage. A Containment Region includes, for instance, identification for a set of impacted resources, as well as BR specific information about the failure/degraded state, as well as proposed recovery. CRs are associated with a set of impacted resources, and are dynamically constructed by BR in assessing the error.

The original resources reporting degraded availability, as well as the resources related to those reporting degraded availability, are identified as part of the Containment Region. Impacted resources are accumulated into the topology by traversing the IT relationships and inspecting the attributes defined to the relationships. The Containment Region is transitioned to an inactive state after a successful recovery workflow has completed, and after all information (or a selected subset in another example) about the CR has been logged.

6. Redundancy Groups (RG) (422).

Redundancy Group(s) (422) are components of the BR System that represent sets of logically equivalent services that can be used as alternates when a resource experiences failure or degradation. For example, three instances of a database may form a redundancy group, if an application server requires connectivity to one of the set of three, but does not specify one specific instance.

There can be zero or more Redundancy Groups in a BR System.

Redundancy Groups also have an associated state that is maintained in realtime, and can contribute to the definition of what constitutes available, degraded, or unavailable states. In addition, Redundancy Groups members are dynamically and automatically selected by the BR System, based on availability of the member and co-location constraints.

7. BR Manager Data Table (BRMD) (424).

BR maintains specific internal information related to various resources it manages and each entry in the BR specific Management Data (BRMD) table represents such a record of management. Entries in the BRMD represent IT resources.

8. BR Manager Relationship Data Table (BRRD) (426).

BR maintains BR specific internal information related to the pairings of resources it needs to interact with, and each entry in the BR specific Relationship Data (BRRD) table represents an instance of such a pairing. The pairing record identifies the resources that participate in the pairing, and resources can be any of those that appear in the BRMD above. The BRRD includes information about the pairings, which include operation ordering across resources, failure and degradation impact across resources, constraint specifications for allowable recovery actions, effect an operation has on resource state, requirements for resource to co-locate or anti-co-locate, and effects of preparatory actions on resources.

9. BR Asynchronous Distributor (BRAD) (428).

The BR Asynchronous Distributor (BRAD) is used to handle asynchronous behavior during time critical queries for resource state and key properties, recovery, and for getting observations back from resources for the observation log.

10. Observation Log (430).

The Observation Log captures the information that is returned through periodic observations of the environment. The information in the Observation Log is used by cluster tooling to generate Pattern System Environments (PSE).

11. RS Activity Log (432).

Each RS has an activity log that represents the RS actions, successes, failures. Activity logs are internal BR structures. Primarily, they are used for either problem determination purposes or at runtime, recovery of failed BR components. For example, when the RS fails and recovers, it reads the Activity Log to understand what was in progress at time of failure, and what needs to be handled in terms of residuals.

12. BRM Activity Log (434).

The BRM also has an activity log that represents BRM actions, success, failures. Activity logs are internal BR structures.

13. Transaction Table (TT) (436).

The transaction table is a serialization mechanism used to house the counts of ongoing recovery and preparatory operations. It is associated with the RS, and is referred to as the RS TT.

In addition to the Business Resilience Runtime Component of the BR system, the BR system includes the following components, previously mentioned above.

User Interface (UI) Component (404).

The User interface component is, for instance, a graphical environment through which the customer's IT staff can make changes to the BR configuration. As examples: create and manage Recovery Segments; specify recovery goals; validate achievability of goals prior to failure time; view and alter BR generated workflows.

The user interface (UI) is used as the primary interface for configuring BR. It targets roles normally associated with a Business Analyst, Solution Architect, System Architect, or Enterprise Architect, as examples.

One purpose of the BR UI is to configure the BR resources. It allows the user to create BR artifacts that are used for a working BR runtime and also monitors the behaviors and notifications of these BR resources as they run. In addition, the BR UI allows interaction with resources in the environment through, for instance, relationships and their surfaced properties and operations. The user can add resources to BR to affect recovery and behaviors of the runtime environment.

The BR UI also surfaces recommendations and best practices in the form of templates. These are reusable constructs that present a best practice to the user which can then be approved and realized by the user.

Interaction with the BR UI is based on the typical editor save lifecycle used within, for instance, the developmental tool known as Eclipse (available and described at www.Eclipse.org). The user typically opens or edits an existing resource, makes modifications, and those modifications are not persisted back to the resource until the user saves the editor.

Predefined window layouts in Eclipse are called perspectives. Eclipse views and editors are displayed in accordance with the perspective's layout, which can be customized by the user. The BR UI provides a layout as exemplified in the screen display depicted in FIG. 5A.

Figure 5A:
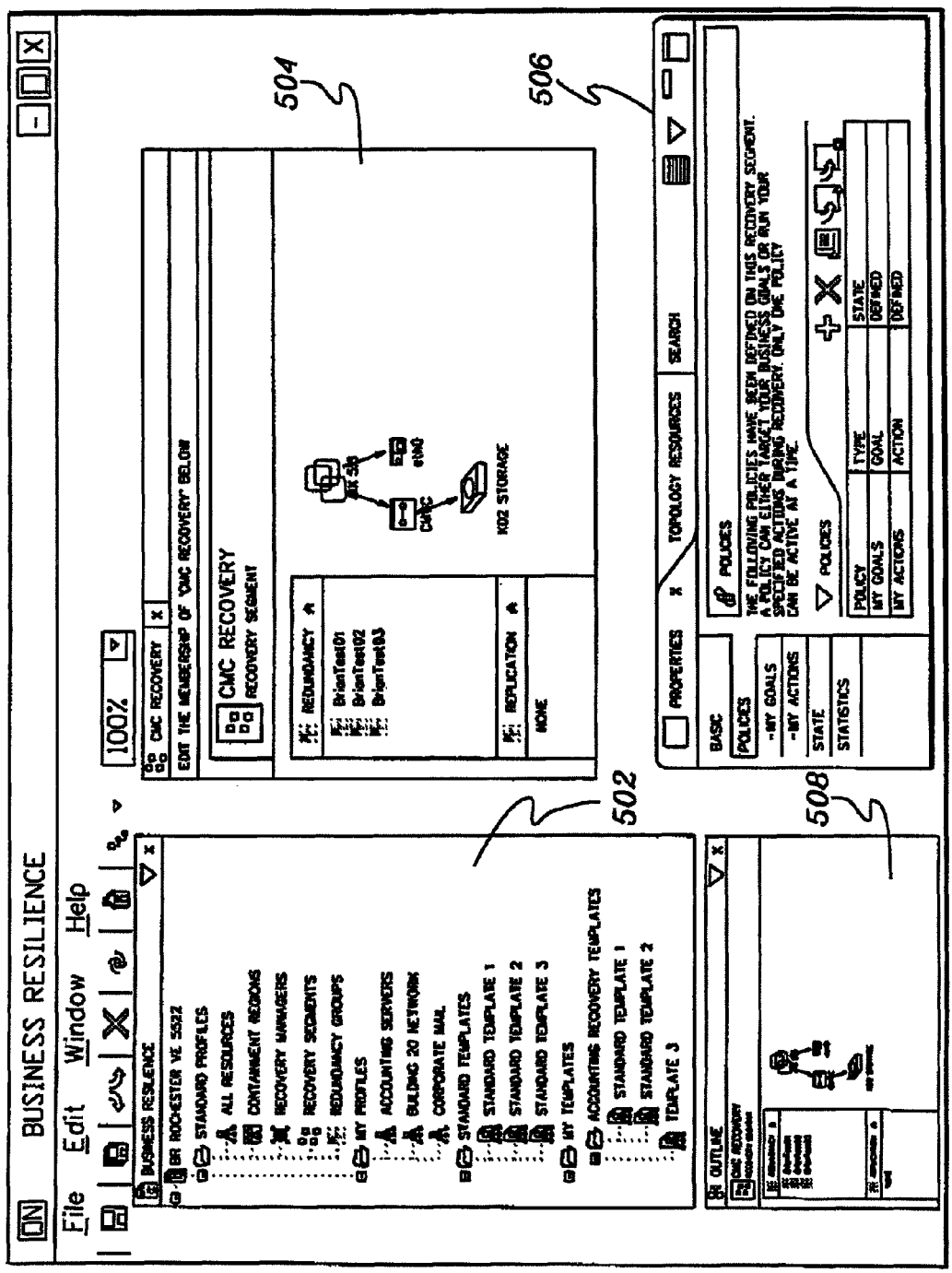
FIG. 5A depicts one example of a screen display of a business resilience perspective, in accordance with an aspect of the present invention.

Screen display 500 depicted in FIG. 5A displays one example of a Business Resilience Perspective. Starting in the upper left corner and rotating clockwise, the user interface includes, for instance:

1. Business Resilience View 502

This is where the user launches topologies and definition templates for viewing and editing.

2. Topology/Definition Template Editor 504

This is where the editors are launched from the Business Resilience View display. The user can have any number of editors open at one time.

3. Properties View/Topology Resources View/Search View

The property and topology resource views are driven off the active editor. They display information on the currently selected resource and allow the user to modify settings within the editor.

4. Outline View 508

This view provides a small thumbnail of the topology or template being displayed in the editor. The user can pan around the editor quickly by moving the thumbnail.

Figure 5B:
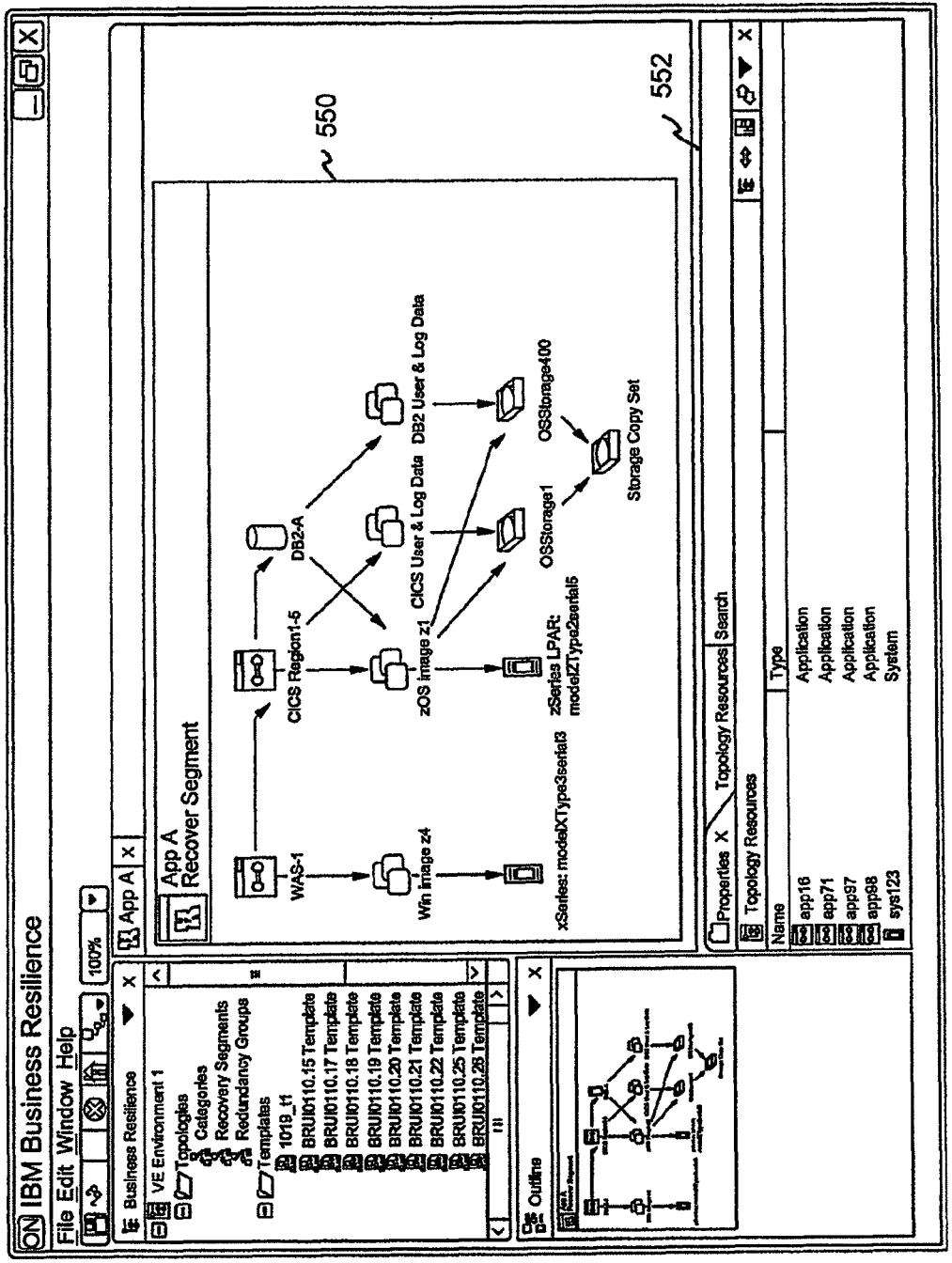
FIG. 5B depicts one example of a screen display of a Recovery Segment, in accordance with an aspect of the present invention.

The topology is reflected by a RS, as shown in the screen display of FIG. 5B. In FIG. 5B, a Recovery Segment 550 is depicted, along with a list of one or more topology resources 552 of the RS (not necessarily shown in the current view of the RS).

In one example, the BR UI is created on the Eclipse Rich Client Platform (RCP), meaning it has complete control over the Eclipse environment, window layouts, and overall behavior. This allows BR to tailor the Eclipse platform and remove Eclipse artifacts not directly relevant to the BR UI application, allowing the user to remain focused, while improving usability.

BR extends the basic user interface of Eclipse by creating software packages called "plugins' that plug into the core Eclipse platform architecture to extend its capabilities. By implementing the UI as a set of standard Eclipse plug-ins, BR has the flexibility to plug into Eclipse, WebSphere Integration Developer, or Rational product installs, as examples. The UI includes two categories of plug-ins, those that are BR specific and those that are specific to processing resources in the IT environment. This separation allows the resource plug-ins to be potentially re-used by other products.

By building upon Eclipse, BR has the option to leverage other tooling being developed for Eclipse. This is most apparent in its usage of BPEL workflow tooling, but the following packages and capabilities are also being leveraged, in one embodiment, as well:

The Eclipse platform provides two graphical toolkit packages, GEF and Draw2D, which are used by BR, in one example, to render topology displays and handle the rather advanced topology layouts and animations. These packages are built into the base Eclipse platform and provide the foundation for much of the tooling and topology user interfaces provided by this design.

The Eclipse platform allows building of advanced editors and forms, which are being leveraged for BR policy and template editing. Much of the common support needed for editors, from the common save lifecycle to undo and redo support, is provided by Eclipse.

The Eclipse platform provides a sophisticated Welcome and Help system, which helps introduce and helps users to get started configuring their environment. Likewise, Eclipse provides a pluggable capability to create task instructions, which can be followed step-by-step by the user to accomplish common or difficult tasks.

Figure 4:
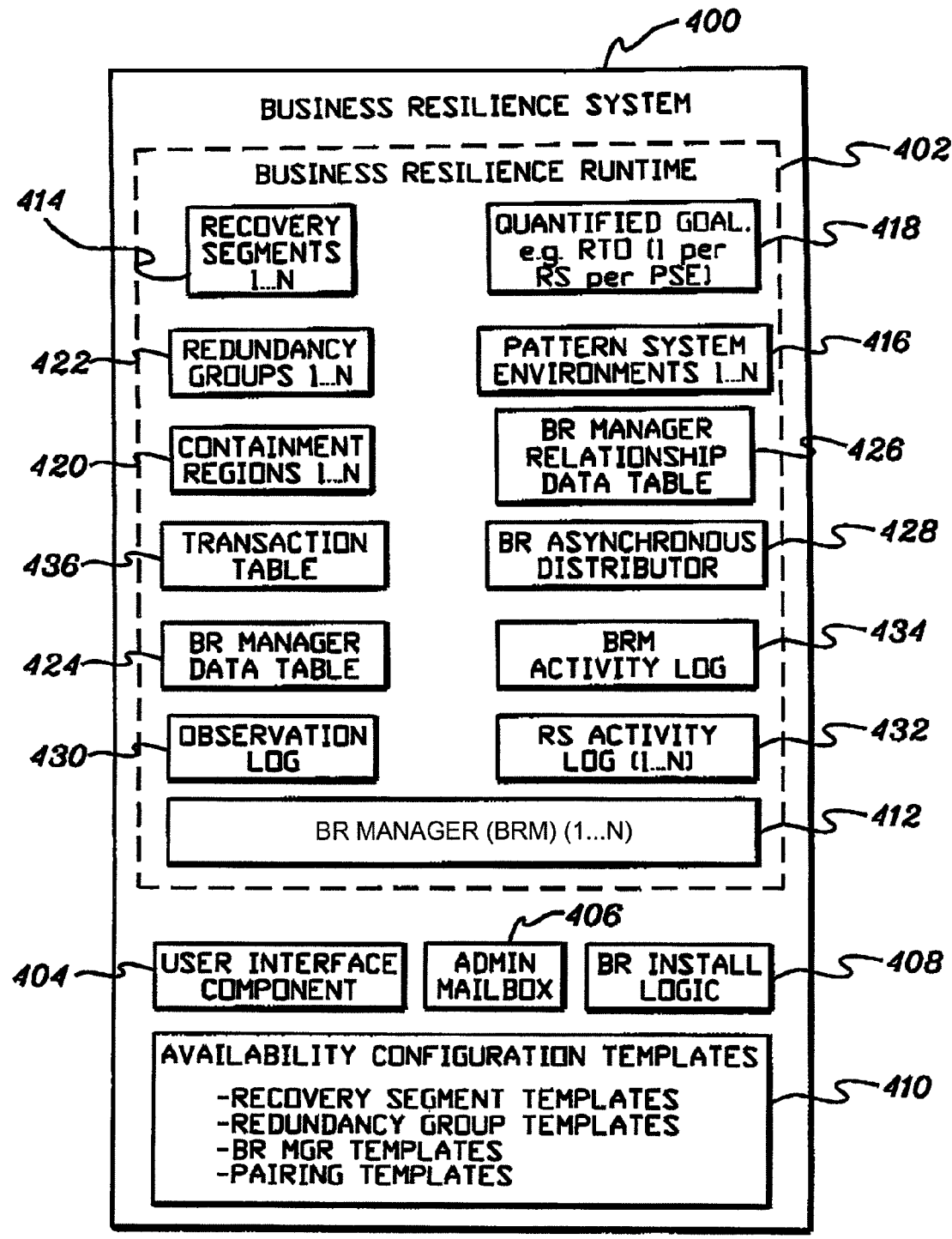
FIG. 4 depicts one embodiment of a Business Resilience System used in accordance with an aspect of the present invention.

BR Admin Mailbox (406) (FIG. 4).

The BR Admin (or Administrative) Mailbox is a mechanism used by various flows of the BR runtime to get requests to an administrator to take some action. The Admin mailbox periodically retrieves information from a table, where BR keeps an up-to-date state.

As an example, the Admin Mailbox defines a mechanism where BR can notify the user of important events needing user attention or at least user awareness. The notifications are stored in the BR database so they can be recorded while the UI is not running and then shown to the user during their next session.

The notifications are presented to the user, in one example, in their own Eclipse view, which is sorted by date timestamp to bubble the most recent notifications to the top. An example of this view is shown in FIG. 6A. As shown, a view 600 is presented that includes messages 602 relating to resources 604. A date timestamp 606 is also included therewith.

Double clicking a notification opens an editor on the corresponding resource within the BR UI, which surfaces the available properties and operations the user may need to handle the notification.

The user is able to configure the UI to notify them whenever a notification exceeding a certain severity is encountered. The UI then alerts 650 the user of the notification and message when it comes in, as shown in FIG. 6B, in one example.

When alerted, the user can choose to open the corresponding resource directly. If the user selects No, the user can revisit the message or resource by using the above notification log view.

BR Install Logic (408) (FIG. 4).

The BR Install logic initializes the environment through accessing the set of preconfigured template information and vendor provided tables containing resource and relationship information, then applying any customizations initiated by the user.

Availability Configuration Templates (410):

Recovery Segment Templates

The BR System has a set of Recovery Segment templates which represent common patterns of resources and relationships. These are patterns matched with each individual customer environment to produce recommendations for RS definitions to the customer, and offer these visually for customization or acceptance.

Redundancy Group Templates

The BR System has a set of Redundancy Group templates which represent common patterns of forming groups of redundant resources. These are optionally selected and pattern matched with each individual customer environment to produce recommendations for RG definitions to a customer.

BR Manager Deployment Templates

The BR System has a set of BR Manager Deployment templates which represent recommended configurations for deploying the BR Manager, its related Recovery Segments, and the related BR management components. There are choices for distribution or consolidation of these components. Best practice information is combined with optimal availability and performance characteristics to recommend a configuration, which can then be subsequently accepted or altered by the customer.

Pairing Templates

The BR System has a set of Pairing Templates used to represent best practice information about which resources are related to each other.

The user interface, admin mailbox, install logic and/or template components can be part of the same computing unit executing BR Runtime or executed on one or more other distributed computing units.

To further understand the use of some of the above components and their interrelationships, the following example is offered. This example is only offered for clarification purposes and is not meant to be limiting in any way.

Figure 7:
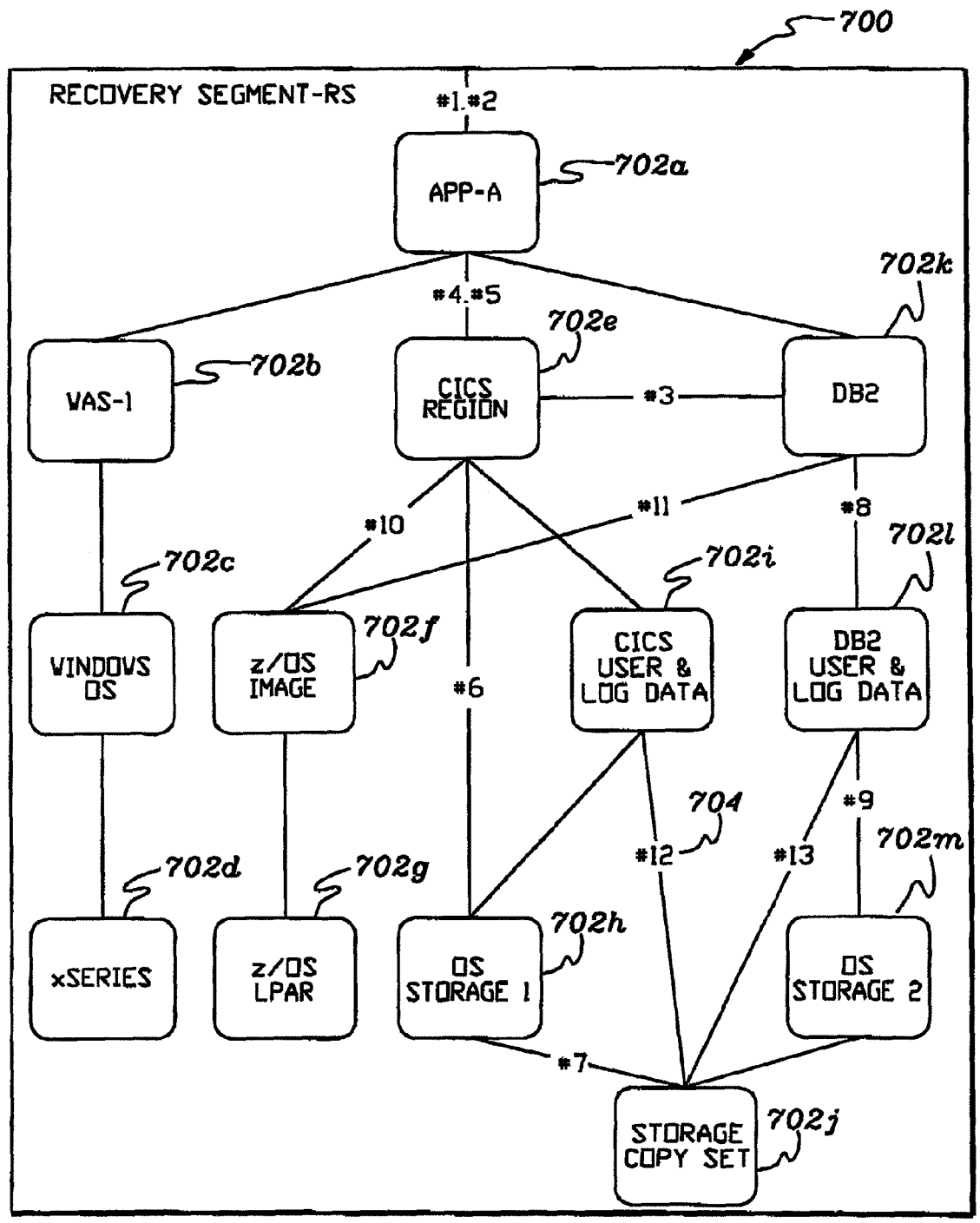
FIG. 7 depicts one example of a Recovery Segment of the Business Resilience System of FIG. 4, in accordance with an aspect of the present invention.

Referring to FIG. 7, a Recovery Segment RS 700 is depicted. It is assumed for this Recovery Segment that:

The Recovery Segment RS has been defined associated with an instantiated and deployed BR Manager for monitoring and management.

Relationships have been established between the Recovery Segment RS and the constituent resources 702a-702m.

A goal policy has been defined and validated for the Recovery Segment through interactions with the BR UI.

The following impact pairings have been assigned to the resources and relationships:

| Rule | Resource #1 | State | Resource #2 | State |
|---|---|---|---|---|
| 1 | App-A | Degraded | RS | Degraded |
| 2 | App-A | Unavailable | RS | Unavailable |
| 3 | DB2 | Degraded | CICS | Unavailable |
| 4 | CICS | Unavailable | App-A | Unavailable |
| 5 | CICS | Degraded | App-A | Degraded |
| 6 | OSStorage-1 | Unavailable | CICS | Degraded |
| 7 | OSStorage-1 | Unavailable | Storage Copy Set | Degraded |
| 8 | DB2 User & Log Data | Degraded | DB2 | Degraded |
| 9 | OSStorage-2 | Unavailable | DB2 User & Log Data | Degraded |
| 10 | z/OS | Unavailable | CICS | Unavailable |
| 11 | z/OS | Unavailable | DB2 | Unavailable |
| 12 | Storage Copy Set | Degraded | CICS User & Log Data | Degraded |
| 13 | Storage Copy Set | Degraded | DB2 User & Log Data | Degraded |

The rules in the above table correspond to the numbers in the figure. For instance, #12 (704) corresponds to Rule 12 above.

Observation mode for the resources in the Recovery Segment has been initiated either by the customer or as a result of policy validation.

The environment has been prepared as a result of that goal policy via policy validation and the possible creation and execution of a preparatory workflow.

The goal policy has been activated for monitoring by BR.

As a result of these conditions leading up to runtime, the following subscriptions have already taken place:

The BRM has subscribed to runtime state change events for the RS.

RS has subscribed to state change events for the constituent resources.

These steps highlight one example of an error detection process:
The OSStorage-1 resource 702*h* fails (goes Unavailable).
RS gets notified of state change event.
1$^{st}$ level state aggregation determines:
  Storage Copy Set→Degraded
  CICS User & Log Data→Degraded
  DB2 User & Log Data→Degraded
  DB2→Degraded
  CICS→Unavailable
  App-A→Unavailable
1$^{st}$ level state aggregation determines:
  RS→Unavailable
BRM gets notified of RS state change. Creates the following Containment Region:

| Resource | Reason |
| --- | --- |
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

Creates a recovery workflow based on the following resources:

| Resource | State |
| --- | --- |
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

In addition to the above, BR includes a set of design points that help in the understanding of the system. These design points include, for instance:

Goal Policy Support

BR is targeted towards goal based policies—the customer configures his target availability goal, and BR determines the preparatory actions and recovery actions to achieve that goal (e.g., automatically).

Availability management of the IT infrastructure through goal based policy is introduced by this design. The BR system includes the ability to author and associate goal based availability policy with the resource Recovery Segments described herein. In addition, support is provided to decompose the goal policy into configuration settings, preparatory actions and runtime procedures in order to execute against the deployed availability goal. In one implementation of the BR system, the Recovery Time Objective (RTO—time to recover post outage) is a supported goal policy. Additional goal policies of data currency (e.g., Recovery Point Objective) and downtime maximums, as well as others, can also be implemented with the BR system. Recovery Segments provide the context for association of goal based availability policies, and are the scope for goal policy expression supported in the BR design. The BR system manages the RTO through an understanding of historical information, metrics, recovery time formulas (if available), and actions that affect the recovery time for IT resources.

RTO goals are specified by the customer at a Recovery Segment level and apportioned to the various component resources grouped within the RS. In one example, RTO goals are expressed as units of time intervals, such as seconds, minutes, and hours. Each RS can have one RTO goal per Pattern System Environment associated with the RS. Based on the metrics available from the IT resources, and based on observed history and/or data from the customer, the RTO goal associated with the RS is evaluated for achievability, taking into account which resources are able to be recovered in parallel.

Based on the RTO for the RS, a set of preparatory actions expressed as a workflow is generated. This preparatory workflow configures the environment or makes alterations in the current configuration, to achieve the RTO goal or to attempt to achieve the goal.

In terms of optimizing RTO, there are tradeoffs associated with the choices that are possible for preparatory and recovery actions. Optimization of recovery choice is performed by BR, and may include interaction at various levels of sophistication with IT resources. In some cases, BR may set specific configuration parameters that are surfaced by the IT resource to align with the stated RTO. In other cases, BR may request that an IT resource itself alter its management functions to achieve some portion of the overall RS RTO. In either case, BR aligns availability management of the IT resources contained in the RS with the stated RTO.

Metrics and Goal Association

In this design, as one example, there is an approach to collecting the required or desired metrics data, both observed and key varying factors, system profile information that is slow or non-moving, as well as potential formulas that reflect a specific resource's use of the key factors in assessing and performing recovery and preparatory actions, historical data and system information. The information and raw metrics that BR uses to perform analysis and RTO projections are expressed as part of the IT resources, as resource properties. BR specific interpretations and results of statistical analysis of key factors correlated to recovery time are kept as BR Specific Management data (BRMD).

Relationships used by BR, and BR Specific Resource Pairing Information

BR maintains specific information about the BR management of each resource pairing or relationship between resources. Information regarding the BR specific data for a resource pairing is kept by BR, including information such as ordering of operations across resources, impact assessment information, operation effect on availability state, constraint analysis of actions to be performed, effects of preparatory actions on resources, and requirements for resources to co-locate or anti-co-locate.

Evaluation of Failure Scope

One feature of the BR function is the ability to identify the scope and impact of a failure. The BR design uses a Containment Region to identify the resources affected by an incident. The Containment Region is initially formed with a fairly tight restriction on the scope of impact, but is expanded on receiving errors related to the first incident. The impact and scope of the failure is evaluated by traversing the resource relationships, evaluating information on BR specific resource pairing information, and determining most current state of the resources impacted.

Generation and Use of Workflow

Various types of preparatory and recovery processes are formulated and in some cases, optionally initiated. Workflows used by BR are dynamically generated based on, for instance, customer requirements for RTO goal, based on actual scope of failure, and based on any configuration settings customers have set for the BR system.

A workflow includes one or more operations to be performed, such as Start CICS, etc. Each operation takes time to execute and this amount of time is learned based on execution of the workflows, based on historical data in the observation log or from customer specification of execution time for operations. The workflows formalize, in a machine readable, machine editable form, the operations to be performed.

In one example, the processes are generated into Business Process Execution Language (BPEL) compliant workflows with activities that are operations on IT resources or specified manual, human activities. For example, BRM automatically generates the workflows in BPEL. This automatic generation includes invoking routines to insert activities to build the workflow, or forming the activities and building the XML (Extensible Mark-Up Language). Since these workflows are BPEL standard compliant, they can be integrated with other BPEL defined workflows which may incorporate manual activities performed by the operations staff. These BR related workflows are categorized as follows, in one example:

Preparatory—Steps taken during the policy prepare phase in support of a given goal, such as the setting of specific configuration values, or the propagation of availability related policy on finer grained resources in the Recovery Segment composition. BR generates preparatory workflows, for instance, dynamically. Examples of preparatory actions include setting up storage replication, and starting additional instances of middleware subsystems to support redundancy.

Recovery—Steps taken as a result of fault detection during runtime monitoring of the environment, such as, for example, restarting a failed operating system (OS). BR generates recovery workflows dynamically, in one example, based on the actual failure rather than a pre-specified sequence.

Preventive—Steps taken to contain or fence an error condition and prevent the situation from escalating to a more substantial outage or impact; for example, the severing of a failed resource's relationship instances to other resources. Preventive workflows are also dynamically generated, in one example.

Return—Steps taken to restore the environment back to 'normal operations' post recovery, also represented as dynamically generated workflows, as one example.

Capturing of Workflow Information

Since the set of BR actions described above modify existing IT environments, visibility to the actions that are taken by BR prior to the actual execution is provided. To gain trust in the decisions and recommendations produced by BR, the BR System can run in 'advisory mode'. As part of advisory mode, the possible actions that would be taken are constructed into a workflow, similar to what would be done to actually execute the processes. The workflows are then made visible through standard workflow authoring tooling for customers to inspect or modify. Examples of BPEL tooling include:

Bolie, et al., BPEL Cookbook: Best Practices for SOA-based Integration and Composite Applications Development, ISBN 1904811337, 2006, PACKT Publishing, hereby incorporated herein by reference in its entirety;

Juric, et al., Business Process Execution Language for Web Services: BPEL and BPELYWS, ISBN 1-904811-18-3, 2004, PACKT Publishing, hereby incorporated herein by reference in its entirety.

http://www-306.ibm.com/software/integration/wid/about/?S_CMP=may http://www.eclipse.org/bpel/ http://www.parasoft.com/jsp/products/home.jsp;jessionid=aaa56iqFywA-HJ?product=BPEL&redname=googbpelm&referred=searchengine%2Fgoogle%Fbpel

Tooling Lifecycle, Support of Managed Resources and Roles

BR tooling spans the availability management lifecycle from definition of business objectives, IT resource selection, availability policy authoring and deployment, development and deployment of runtime monitors, etc. In one example, support for the following is captured in the tooling environment for the BR system:

Visual presentation of the IT resources & their relationships, within both an operations and administration context.

Configuration and deployment of Recovery Segments and BRMs.

Authoring and deployment of a BR policy.

Modification of availability configuration or policy changes for BR.

BPEL tooling to support viewing of BR created, as well as customer authored, workflows.

BPEL tooling to support monitoring of workflow status, related to an operations console view of IT resource operational state.

Policy Lifecycle

The policy lifecycle for BR goal policies, such as RTO goals, includes, for example:

Define—Policy is specified to a RS, but no action is taken by the BRM to support the policy (observation information may be obtained).

Validate—Policy is validated for syntax, capability, etc.; preparatory workflow created for viewing and validation by customer.

Prepare—Preparatory action workflows are optionally executed.

Activate—Policy is activated for runtime monitoring of the environment.

Modify—Policy is changed dynamically in runtime.

Configurable State Aggregation

One of the points in determining operational state of a Recovery Segment is that this design allows for customers to configure a definition of specific 'aggregated' states, using properties of individual IT resources. A Recovery Segment is an availability management context, in one example, which may include a diverse set of IT resources.

The customer may provide the rules logic used within the Recovery Segment to consume the relevant IT resource properties and determine the overall state of the RS (available, degraded and unavailable, etc). The customer can develop and deploy these rules as part of the Recovery Segment availability policy. For example, if there is a database included in the Recovery Segment, along with the supporting operating system, storage, and network resources, a customer may configure one set of rules that requires that the database must have completed the recovery of in-flight work in order to consider the overall Recovery Segment available. As another example, customers may choose to configure a definition of availability based on transaction rate metrics for a database, so that if the rate falls below some value, the RS is considered unavailable or degraded, and evaluation of 'failure' impact will be triggered within the BR system. Using these configurations, customers can tailor both the definitions of availability, as well as the rapidity with which problems are detected, since any IT resource property can be used as input to the aggregation, not just the operational state of IT resources.

Failure During Workflow Sequences of Preparatory, Recovery, Preventive

Failures occurring during sequences of operations executed within a BPEL compliant process workflow are intended to be handled through use of BPEL declared compensation actions, associated with the workflow activities that took a failure. The BR System creates associated "undo" workflows that are then submitted to compensate, and reset the environment to a stable state, based on where in the workflow the failure occurred.

Customer Values

The following set of customer values, as examples, are derived from the BR system functions described above, listed here with supporting technologies from the BR system:

Align total IT runtime environment to business function availability objectives:
  RS definition from representation of IT Resources;
  Goal (RTO) and action policy specification, validation and activation; and
  Tooling by Eclipse, as an example, to integrate with IT process management.

1 Rapid, flexible, administrative level:
  Alteration of operation escalation rules;
  Customization of workflows for preparatory and recovery to customer goals;
  Customization of IT resource selection from RG based on quality of service (QoS);
  Alteration of definition of IT resource and business application state (available, degraded, or unavailable);
  Customization of aggregated state;
  Modification of topology for RS and RG definition;
  Selection of BR deployment configuration;
  Alteration of IT resource recovery metrics;
  Customization of generated Pattern System Environments; and
  Specification of statistical tolerances required for system environment formation or recovery metric usage.

Extensible framework for customer and vendor resources:
  IT resource definitions not specific to BR System; and
  Industry standard specification of workflows, using, for instance, BPEL standards.

Adaptive to configuration changes and optimization:
  IT resource lifecycle and relationships dynamically maintained;
  System event infrastructure utilized for linkage of IT resource and BR management;
  IT resource recovery metrics identified and collected;
  IT resource recovery metrics used in forming Pattern System Environments;
  Learned recovery process effectiveness applied to successive recovery events;
  System provided measurement of eventing infrastructure timing;
  Dynamic formation of time intervals for aggregation of related availability events to a root cause; and
  Distribution of achieved recovery time over constituent resources.

Incremental adoption and coexistence with other availability offerings:
  Potential conflict of multiple managers for a resource based on IT representation;
  Workflows for recovery and preparatory reflect operations with meta data linked to existing operations;
  Advisory mode execution for preparatory and recovery workflows; and
  Incremental inclusion of resources of multiple types.

Support for resource sharing:
  Overlapping and contained RS;
  Merger of CR across RS and escalation of failure scope; and
  Preparatory and recovery workflows built to stringency requirements over multiple RS.

Extensible formalization of best practices based on industry standards:
  Templates and patterns for RS and RG definition;
  Preparatory and recovery workflows (e.g., BPEL) for customization, adoption; and
  Industry standard workflow specifications enabling integration across customer and multiple vendors.

Integration of business resilience with normal runtime operations and IT process automation:
  Option to base on IT system wide, open industry standard representation of resources;
  BR infrastructure used for localized recovery within a system, cluster and across sites; and
  Utilization of common system infrastructure for events, resource discovery, workflow processing, visualization.

Management of the IT environment is adaptively performed, as described herein and in a U.S. Patent Application "Adaptive Business Resiliency Computer System for Information Technology Environments," (POU920070364US1), Bobak et al., co-filed herewith, which is hereby incorporated herein by reference in its entirety.

Many different sequences of activities can be undertaken in creating a BR environment. The following represents one possible sequence; however, many other sequences are possible. This sequence is provided merely to facilitate an understanding of a BR system and one or more aspects of the present invention. This sequence is not meant to be limiting in any way. In the following description, reference is made to various U.S. patent applications, which are co-filed herewith.

On receiving the BR and related product offerings, an installation process is undertaken. Subsequent to installation of the products, a BR administrator may define the configuration for BR manager instances with the aid of BRM configuration templates.

Having defined the BRM configuration a next step could be to define Recovery Segments as described in "Recovery Segments for Computer Business Applications," (POU920070108US1), Bobak et al., which is hereby incorporated herein by reference in its entirety.

Definition of a RS may use a representation of resources in a topology graph as described in "Use of Graphs in Managing Computing Environments," (POU920070112US1), Bobak et al., which is hereby incorporated herein by reference in its entirety.

It is expected that customers will enable BR operation in "observation" mode for a period of time to gather information regarding key metrics and operation execution duration associated with resources in a RS.

At some point, sufficient observation data will have been gathered or a customer may have sufficient knowledge of the environment to be managed by BR. A series of activities may then be undertaken to prepare the RS for availability management by BR. As one example, the following steps may be performed iteratively.

A set of functionally equivalent resources may be defined as described in "Use of Redundancy Groups in Runtime Computer Management of Business Applications," (POU920070113US1), Bobak et al., which is hereby incorporated herein by reference in its entirety.

Specification of the availability state for individual resources, redundancy groups and Recovery Segments may be performed as described in "Use of Multi-Level State Assessment in Computer Business Environments," (POU920070114US1), Bobak et al., which is hereby incorporated herein by reference in its entirety.

Representations for the IT environment in which BR is to operate may be created from historical information captured during observation mode, as described herein, in accordance with one or more aspects of the present invention. These definitions provide the context for understanding how long it takes to perform operations which change the configuration—especially during recovery periods.

Information on relationships between resources may be specified based on recommended best practices—expressed in templates—or based on customer knowledge of their IT environment as described in "Conditional Computer Runtime Control of an Information Technology Environment Based on Pairing Constructs," (POU920070110US1), Bobak et al., which is hereby incorporated herein by reference in its entirety. Pairing processing provides the mechanism for reflecting required or desired order of execution for operations, the impact of state change for one resource on another, the effect execution of an operation is expected to have on a resource state, desire to have one subsystem located on the same system as another and the effect an operation has on preparing the environment for availability management.

With preliminary definitions in place, a next activity of the BR administrator might be to define the goals for availability of the business application represented by a Recovery Segment as described in "Programmatic Validation in an Information Technology Environment," (POU920070111 US1), Bobak et al., which is hereby incorporated herein by reference in its entirety.

Managing the IT environment to meet availability goals includes having the BR system prioritize internal operations. The mechanism utilized to achieve the prioritization is described in "Serialization in Computer Management," (POU920070105US1), Bobak et al., which is hereby incorporated herein by reference in its entirety.

Multiple operations are performed to prepare an IT environment to meet a business application's availability goal or to perform recovery when a failure occurs. The BR system creates workflows to achieve the required or desired ordering of operations, as described in "Dynamic Generation of processes in Computing Environments," (POU920070123US1), Bobak et al., which is hereby incorporated herein by reference in its entirety.

A next activity in achieving a BR environment might be execution of the ordered set of operations used to prepare the IT environment, as described in "Dynamic Selection of Actions in an Information Technology Environment," (POU920070117US1), Bobak et al., which is hereby incorporated herein by reference in its entirety.

Management by BR to achieve availability goals may be initiated, which may initiate or continue monitoring of resources to detect changes in their operational state, as described in "Real-Time Information Technology Environments," (POU920070120US1), Bobak et al., which is hereby incorporated herein by reference in its entirety. Monitoring of resources may have already been initiated as a result of "observation" mode processing.

Changes in resource or redundancy group state may result in impacting the availability of a business application represented by a Recovery Segment. Analysis of the environment following an error is performed. The analysis allows sufficient time for related errors to be reported, insures gathering of resource state completes in a timely manner and insures sufficient time is provided for building and executing the recovery operations—all within the recovery time goal, as described in "Management Based on Computer Dynamically Adjusted Discrete Phases of Event Correlation," (POU920070119US1), Bobak et al., which is hereby incorporated herein by reference in its entirety.

A mechanism is provided for determining if events impacting the availability of the IT environment are related, and if so, aggregating the failures to optimally scope the outage, as described in "Management of Computer Events in a Computer Environment," (POU920070118US1), Bobak et al., which is hereby incorporated herein by reference in its entirety.

Ideally, current resource state can be gathered after scoping of a failure. However, provisions are made to insure management to the availability goal is achievable in the presence of non-responsive components in the IT environment, as described in "Managing the Computer Collection of Information in an Information Technology Environment," (POU920070121 US1), Bobak et al., which is hereby incorporated herein by reference in its entirety.

With the outage scoped and current resource state evaluated, the BR environment can formulate an optimized recovery set of operations to meet the availability goal, as described in "Defining a Computer Recovery Process that Matches the Scope of Outage," (POU920070124US1), Bobak et al., which is hereby incorporated herein by reference in its entirety.

Formulation of a recovery plan is to uphold customer specification regarding the impact recovery operations can have between different business applications, as described in "Managing Execution Within a Computing Environment," (POU920070115US1), Bobak et al., which is hereby incorporated herein by reference in its entirety.

Varying levels of recovery capability exist with resources used to support a business application. Some resources possess the ability to perform detailed recovery actions while others do not. For resources capable of performing recovery operations, the BR system provides for delegation of recovery if the resource is not shared by two or more business applications, as described in "Conditional Actions Based on Runtime Conditions of a Computer System Environment," (POU920070116US1), Bobak et al., which is hereby incorporated herein by reference in its entirety.

Having evaluated the outage and formulated a set of recovery operations, the BR system resumes monitoring for subsequent changes to the IT environment.

In support of mainline BR system operation, there are a number of activities including, for instance:

Coordination for administrative task that employ multiple steps, as described in "Adaptive Computer Sequencing of Actions," (POU920070106US1), Bobak et al., which is hereby incorporated herein by reference in its entirety.

Use of provided templates representing best practices in defining the BR system, as described in "Defining and Using Templates in Configuring Information Technology Environments," (POU920070109US1), Bobak et al., which is hereby incorporated herein by reference in its entirety.

Use of provided templates in formulation of workflows, as described in "Using Templates in a Computing Environment," (POU920070126US1), Bobak et al., which is hereby incorporated herein by reference in its entirety.

Making changes to the availability goals while supporting ongoing BR operation, as described in "Non-Disruptively Changing a Computing Environment," (POU920070122US1), Bobak et al., which is hereby incorporated herein by reference in its entirety.

Making changes to the scope of a business application or Recovery Segment, as described in "Non-Disruptively Changing Scope of Computer Business Applications Based on Detected Changes in Topology," (POU920070125US1), Bobak et al., which is hereby incorporated herein by reference in its entirety.

Detecting and recovery for the BR system is performed non-disruptively, as described in "Managing Processing of a Computing Environment During Failures of the Environment," (POU920070365US1), Bobak et al., which is hereby incorporated herein in its entirety.

In order to build a BR environment that meets recovery time objectives, IT configurations within a customer's location are to be characterized and knowledge about the duration of execution for recovery time operations within those configurations is to be gained. IT configurations and the durations for operation execution vary by time, constituent resources, quantity and quality of application invocations, as examples. Customer environments vary widely in configuration of IT resources in support of business applications. Understanding the customer environment and the duration of operations within those environments aids in insuring a Recovery Time Objective is achievable and in building workflows to alter the customer configuration of IT resources in advance of a failure and/or when a failure occurs.

A characterization of IT configurations within a customer location is built by having knowledge of the key recovery time characteristics for individual resources (i.e., the resources that are part of the IT configuration being managed; also referred to as managed resources). Utilizing the representation for a resource, a set of key recovery time objective (RTO) metrics are specified by the resource owner. During ongoing operations, the BR manager gathers values for these key RTO metrics and gathers timings for the operations that are used to alter the configuration. It is expected that customers will run the BR function in "observation" mode prior to having provided a BR policy for availability management or other management. While executing in "observation" mode, the BR manager periodically gathers RTO metrics and operation execution durations from resource representations. The key RTO metrics properties, associated values and operation execution times are recorded in an Observation log for later analysis through tooling. Key RTO metrics and operation execution timings continue to be gathered during active BR policy management in order to maintain currency and iteratively refine data used to characterize customer IT configurations and operation timings within those configurations.

Examples of RTO properties and value range information by resource type are provided in the below table. It will be apparent to those skilled in the art that additional, less, and/or different resource types, properties and/or value ranges may be provided.

| Resource Type | Property | Value Range |
|---|---|---|
| Operating System | Identifier | Text |
| | State | Ok, stopping, planned stop, stopped, starting, error, lost monitoring capability, unknown |
| | Memory Size | Units in MB |
| | Number of systems in sysplex, if applicable | integer |
| | Last IPL time of day | Units in time of day/clock |
| | Type of last IPL | Cold, warm, emergency |
| | Total Real Storage Available | Units in MB |
| | GRS Star Mode | Yes or No |
| | Complete IPL time to reach 'available' | Units of elapsed time |
| | Total CPU using to reach available during IPL | Units of elapsed time |
| | Total CPU delay to reach available during IPL | Units of elapsed time |
| | Total Memory using to reach available during IPL | Units in MB |
| | Total Memory delay to reach available during IPL | Units of elapsed time |
| | Total i/o requests | Integer value, number of requests |
| | Total i/o using to reach available during IPL | Units of elapsed time |
| | Total i/o delay to reach available during IPL | Units of elapsed time |
| Computer System (LPAR, Server, etc.) | Identifier | Text |
| | State | Ok, stopping, stopped, planned down, starting, error, lost monitoring capability, unknown |
| | Type of CPU - model, type, serial | Text value |
| | Number of CPUs | integer |
| | Number of shared processors | integer |
| | Number of dedicated processors | integer |
| | Last Activate Time of Day | Units in time of day/clock |

-continued

| Resource Type | Property | Value Range |
|---|---|---|
| Network Components | | |
| Group of Network Connections | Identity | |
| | Operational State | Ok, Starting, Disconnected, Stopping, Degraded, Unknown |
| | State of each associated Network Application Connection | Text |
| | Performance Stats on loss and delays | Complex |
| | Recovery Time for any associated application network connections | Units in elapsed time |
| | Number of active application network connections associated at time of network problem | Integer |
| | Stopped Time/duration for group of connectoins | Units in elapsed time |
| | Maximum Network Recovery Time for any application connection in group | Units in elapsed time |
| | Maximum Number of active connections at time of network problem encountered, for any application connection in group | Integer |
| | Maximum Number of connections processed at time of network recovery, for the group of connections | Integer |
| | Maximum network connection recovery time/duration for any application connection in the group | Units in elapsed time |
| | Maximum Number of connections dropped at time of application network connection recovery, for any application connection in the group | Integer |
| Network Application Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Network Recovery Time for app connection | Units in elapsed time |
| | Number of active connections at time of network problem encountered, on a per app connection basis | Integer |
| | Number of connections processed at time of network recovery, for the app connection | Integer |
| | application network connection recovery time/duration | Units in elapsed time |
| | Number of connections at time of application network connection problem encountered | Integer |
| | Number of connections processed at time of application network connection recovery | Integer |
| | Number of connections dropped at time of application network connection recovery | Integer |
| Network Host Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, | Complex |

-continued

| Resource Type | Property | Value Range |
|---|---|---|
| | service class, number of active Network OS services | |
| | State update Interval | Units of elapsed time |
| | Last restart time of day | Units in time of day/clock |
| | Last Restart Time/Duration | Units in elapsed time |
| | Number of QoS Events, indicating potential degradation | Integer |
| | Number of QoS Events handled, Last handled QoS Event | Integer Text |
| Database Subsystem | Name, identifier | Text |
| | Operational State | Operational, Nonoperational, starting, stopping, in recovery, log suspended, backup initiated, restore initiated, restore complete, in checkpoint, checkpoint completed, applying log, backing out inflights, resolving indoubts, planned termination, lost monitoring capability |
| | Time spent in log apply | Units of elapsed time |
| | Time spent during inflight processing | Units of elapsed time |
| | Time spent during indoubt processing | Units of elapsed time |
| | Total time to restart | Units of elapsed time |
| | Checkpoint frequency | Units of time |
| | Backout Duration | Number of records to read back in log during restart processing |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O using during restart | Units of elapsed time |
| | I/O Delay during restart | Units of elapsed time |
| Database Datasharing Group | Identifer | Text |
| | Operational State | Operational, nonoperational, degraded (some subset of members non operational), lost monitoring capability |
| | Number of locks in Shared Facility | Integer value |
| | Time spent in lock cleanup for last restart | Elapsed time value |
| Database | Identifier | Text |
| Tablespace | Identifier | Text |
| Transaction Region | Identifier | Text |
| | Name | Text |
| | Associated job name | Text |
| | Maximum number of tasks/ threads | Integer value |
| | Restart type for next restart | Warm, cold, emergency |
| | Forward log name | Text |
| | System log name | Text |
| | Operational State | Operational, nonoperational, in recovery, starting, stop normal first quiesce, stop normal second quiesce, stop normal third quiesce |
| | Time spent in log apply | Units of elapsed time |
| | Time during each recovery stage | Units of elapsed time |
| | Total time to restart | Units of elapsed time |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O connect time during restart | Units of elapsed time |
| | I/O Delay during restart | Units of elapsed time |
| | System Logsize | Units in MB |
| | Forward Logsize | Units in MB |
| | Activity Keypoint frequency | Integer —number of writes before activity checkpoint taken |
| | Average Transaction Rate for this region | Number of transactions per second, on average |

-continued

| Resource Type | Property | Value Range |
|---|---|---|
| Transaction Group | Group name | Text |
| Transaction Region File | Filename | Text |
| | Region Name | Text |
| | Dataset Name | Text |
| | Operational State | Operational/enabled, nonoperational/disabled |
| | Open status | Open, closed, closing |
| Transaction | Identifier | Text |
| | Operational State | Running, failed, shunted, retry in progress |
| | Region Name (s) that can run this transaction | Text |
| | Program Name | Text |
| Logical Replication Group of related datasets | Identity | Text |
| | State | |
| | Required currency characteristics for datasets | Complex |
| | Required consistency characteristics for datasets | Complex |
| Replication Group | Identity | |
| | State | |
| Replication Session | Identity | |
| | State | Established, in progress replication, replication successful complete |
| | Type of Session | Flash copy, metro mirror, etc. |
| | Duration of last replication | Units in elapsed time |
| | Time of Day for last replication | Units in time of day/clock |
| | Amount of data replicated at last replication | Units in MB |
| Roleset | Identity | Text |
| | State | |
| CopySet | Identity | Text |
| | State | |
| Dataset | Identity | Text |
| | State | Open, Closed |
| Storage Group | Identity | Text |
| | State | |
| Storage Volume | Identity | Text |
| | State | Online, offline, boxed, unknown |
| Logical Storage Subsystem | Identity | Text |
| | State | |
| Storage Subsystem | Identity | Text |
| | State | |
| | Subsystem I/O Velocity - ratio of time channels are being used | |
| Replication Link (Logical) between Logical Subsystems | Identity | Text |
| | State | Operational, nonoperational, degraded redundancy |
| | Number of configured pipes | Integer |
| | Number of operational pipes | Integer |

Figure 8A:
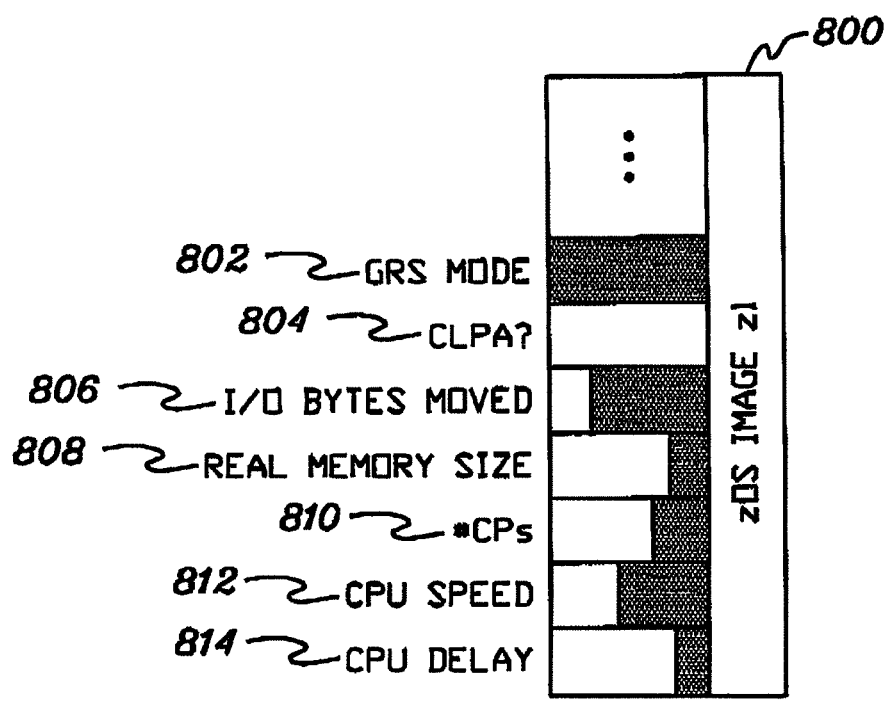
FIG. 8A depicts examples of key Recovery Time Objective properties for a particular resource, in accordance with an aspect of the present invention.

A specific example of key RTO properties for a z/OS® image is depicted in FIG. 8A. As shown, for a z/OS® image 800, the following properties are identified: GRS mode 802, CLPA? (i.e., Was the link pack area page space initialized?) 804, I/O bytes moved 806, real memory size 808, # CPs 810, CPU speed 812, and CPU delay 814, as examples.

Figure 8B:
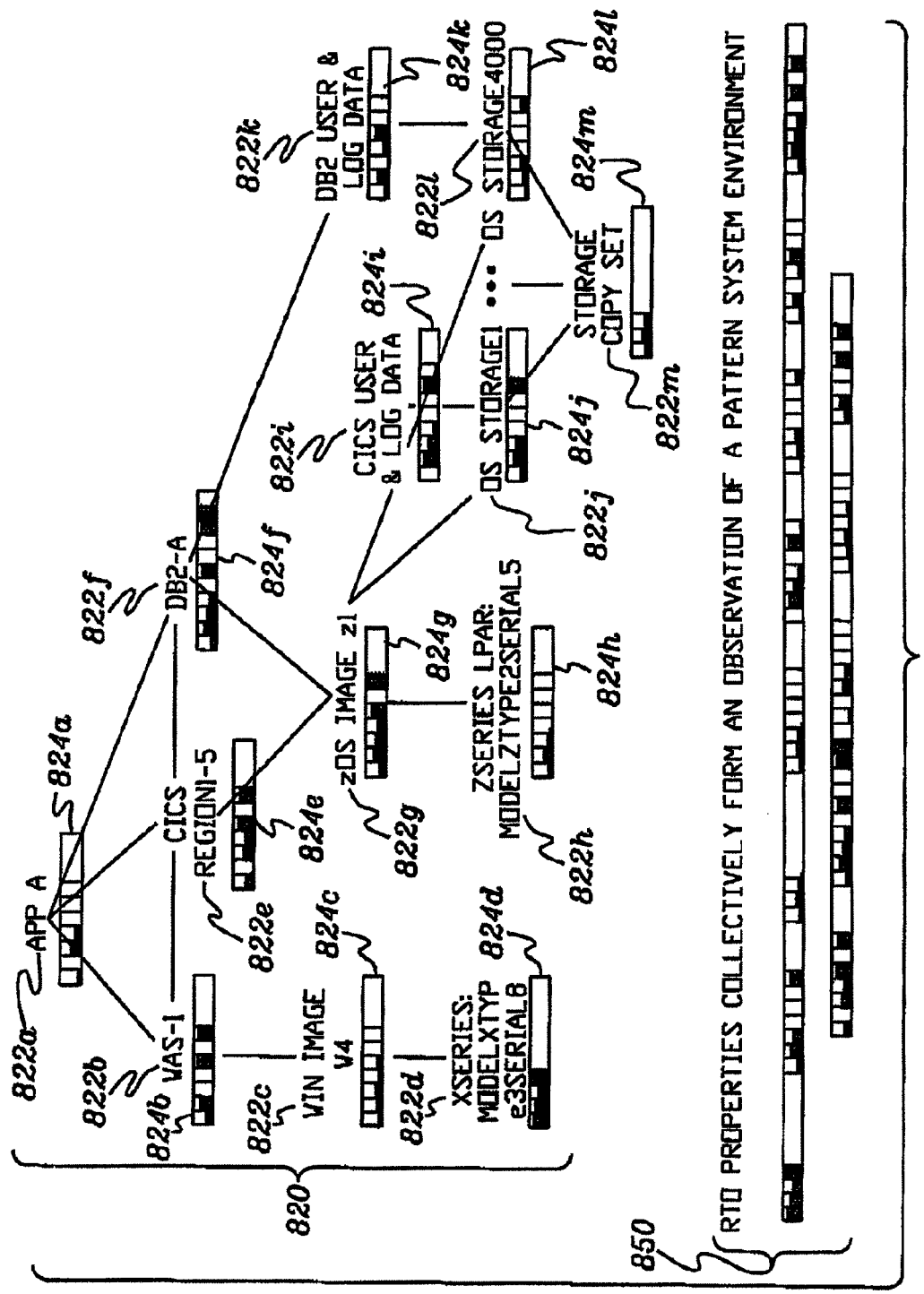
FIG. 8B depicts one example in which Recovery Time Objective properties collectively form an observation of a Pattern System Environment, in accordance with an aspect of the present invention.

The z/OS® image has a set of RTO metrics associated therewith, as described above. Other resources may also have its own set of metrics. An example of this is depicted in FIG. 8B, in which a Recovery Segment 820 is shown that includes a plurality of resources 822a-m, each having its own set of metrics 824a-m, as indicated by the shading.

Further, in one example, the RTO properties from each of the resources that are part of the Recovery Segment for App A have been gathered by BR and formed into an "observation" for recording to the Observation log, as depicted at 850.

Resources have varying degrees of functionality to support RTO goal policy. Such capacity is evaluated by BR, and expressed in resource property RTOGoalCapability in the BRMD entry for the resource. Two options for BR to receive information operation execution timings are: use of historical data or use of explicitly customer configured data. If BR relies on historical data to make recovery time projections, then before a statistically meaningful set of data is collected, this resource is not capable of supporting goal policy. A mix of resources can appear in a given RS—some have a set of observations that allow classification of the operation execution times, and others are explicitly configured by the customer.

Calculation of projected recovery time can be accomplished in two ways, depending on customer choice: use of historical observations or use of customers input timings. The following is an example of values for the RTOGoalCapability metadata that is found in the BRMD entry for the resource that indicates this choice:

| | |
|---|---|
| UseHistoricalObservations | The resource has a collection of statistically meaningful observations of recovery time, where definition of 'statistically valid' is provided on a resource basis, as default by BR, but tailorable by customers |
| UseCustomerInputTimings | The customer can explicitly set the operation timings for a resource |

If the customer is in observation mode, then historical information is captured, regardless of whether the customer has indicated use of explicitly input timings or use of historical information.

The administrator can alter, on a resource basis, which set of timings BR is to use. The default is to use historical observations. In particular, a change source of resource timing logic is provided that alters the source that BR uses to retrieve resource timings. The two options for retrieving timings are from observed histories or explicitly from admin defined times for operation execution. The default uses information from the observed histories, gathered from periodic polls. If the customer defines times explicitly, the customer can direct BR to use those times for a given resource. If activated, observation mode continues and captures information, as well as running averages, and standard deviations. The impact to this logic is to alter the source of information for policy validation and formulation of recovery plan.

With respect to the historical observations, there may be a statistically meaningful set of observations to verify. The sample size should be large enough so that a time range for each operation execution can be calculated, with a sufficient confidence interval. The acceptable number of observations to qualify as statistically meaningful, and the desired confidence interval are customer configurable using BR UI, but provided as defaults in the BRMD entry for the resource. The default confidence interval is 95%, in one example.

There are metrics from a resource that are employed by BR to enable and perform goal management. These include, for instance:

There is also a set of information about the resource that is employed—this information is provided as defaults in the BRMD entry for the resource, but provided to the BR team in the form of best practices information/defaults by the domain owners:

The operational state of the resource at which the observed recovery time interval started.

The operational state of the resource at which the observed recovery time interval ended.

The operational states of the resource at which point it can unblock dependent resources (example: operational states at which a DB2 could unblock new work from CICS, at which it could allow processing of logs for transactions ongoing at time of failure . . . ).

Values of statistical thresholds to indicate sufficient observations for goal managing the resource (number of observations, max standard deviations, confidence level).

In addition to the resources defined herein as part of the IT configuration that is managed, there are other resources, referred to herein as assessed resources. Assessed resources are present primarily to provide observation data for PSE formation, and to understand impact(s) on managed resources. They do not have a decomposed RTO associated with them nor are they acted on for availability by BR. Assessed resources have the following characteristics, as examples:

Are present to collect observation data for PSE formation.

Are present to understand impacts on managed resources.

| Metric | Qualification |
|---|---|
| Last observed recovery/restart time | In milliseconds; or alternately specifying units to use in calculations |
| The key factors and associated values of the resource that affect recovery time | Captured at last observed recovery time, and capturable at a point in time by BR |
| The key factors and associated values of the resource that affect other dependent resources' recovery times | Captured at last observed recovery time, and capturable at a point in time by BR |
| Observed time interval from 'start' state to each 'non-blocking' state | If there are various points in the resource recovery lifecycle at which it becomes non-blocking to other resources which depend upon it, then: Observed time interval from 'start' state to each 'non-blocking' state |
| Resource Consumption Information | If the resource can provide information about its consumption, or the consumption of dependent resources, on an interval basis, then BR will use this information in forming PSEs and classifying timings. One example of this is: cpu, i/o, memory usage information that is available from zOS WLM for an aggregation of processes/address spaces over a given interval. |

No decomposed RTO is associated with an assessed resource.

They are resources on which resources managed by BR depend upon, but are not directly acted on for availability by BR.

They are resources removed (or not explicitly added) from the actively monitored set of resources by the BR admin during RS definition.

They are resources that BR does not try to recover and BR thus will not invoke any preparatory or recovery operations on them.

Similarly, there are likely scenarios where a resource exists in a customer environment that already has an alternative availability management solution, and does not require BR for its availability. However, since other resources that are managed by BR may be dependent on them, they are observed and assessed in order to collect observation data and understand their impacts on managed resources. Additionally, there may be resources that do not have alternative management solutions, but the customer simply does not want them managed by BR, but other managed resources are dependent upon them. They too are classified as assessed resources.

These assessed resources share many of the same characteristics of managed resources, such as, for example:

They have an entry in the BRMD, depending on their use, and the BRMD entry has an indication of assessed vs. managed.

The RS subscribes to state change notifications for assessed resources (and possibly other notifiable properties).

Relationships between observed and managed resources are possible (and likely).

BR monitors for lifecycle events on assessed resources in the same manner as for managed resources.

Assessed resources can be added and/or removed from Recovery Segments.

They can be used to contribute to the aggregated state of an RS.

Finally, there are a few restrictions that BR imposes upon assessed resources, in this embodiment:

Again, BR does not invoke any workflow operations on assessed resources.

A resource that is shared between two Recovery Segments is not categorized as an assessed resource in one RS and a managed resource in the other. It is one or the other in the RS's, but not both.

To facilitate the building of the customer's IT configuration, observations regarding the customer's environment are gathered and stored in an observation log. In particular, the observation log is used to store observations gathered during runtime in customer environments, where each observation is a collection of various data points. They are created for each of the Recovery Segments that are in "observation" mode. These observations are used for numerous runtime and administrative purposes in the BR environment. As examples the observations are used:

To perform statistical analysis from the BR UI to form characterizations of customers' normal execution environments, represented in BR as Pattern System Environments (PSE).

To classify operations on resources into these PSEs for purposes of determining operation execution duration.

Help determine approximate path length of operations that are pushed down from BR to the resources, and possibly to the underlying instrumentation of each resource.

Help determine approximate path length of activities executed within BPEL workflows.

Finally, the data collected via the observation is also used to update the metadata associated with the resource (i.e., in the BRMD table) where appropriate.

BR gathers observations during runtime when "observation mode" is enabled at the Recovery Segment level. There are two means for enabling observation mode, as examples:

1. The BR UI allows the administrator to enable observation mode at a Recovery Segment, which will change its "ObservationMode" resource property to "True", and to set the polling interval (default=15 minutes). The Recovery Segment is defined in order to allow observation mode, but a policy does not have to be defined or activated for it.

2. Once a policy is defined though and subsequently activated, observation mode is set for the Recovery Segment (due to the data being used in managing and monitoring the customer's environment). Thus, it is set automatically at policy activation, if not already set explicitly by the administrator (see 1 above) using the default polling interval (15 minutes).

The administrator may also disable observation mode for a Recovery Segment, which stops it from polling for data and creating subsequent observation records for insertion in the log. However, the accumulated observation log is not deleted. In one example, an RS remains in observation mode throughout its lifecycle. The UI displays the implications of disabling observation mode.

In BR, the observations that are collected by BR during runtime can be grouped into two categories, as examples:
1. Periodic poll.
2. Workflow (includes workflow begin/end, and workflow activity begin/end).

A periodic poll observation is a point-in-time snapshot of the constituent resources in a Recovery Segment. Observation data points are collected for those resources in the Recovery Segment(s) which have associated BR management data for any of the following reasons, as examples:

1. Resource has RTO properties.
2. Resource has operations.
3. Resource participates in the aggregated state for the Recovery Segment, in which it is contained.
4. Resource participates in any of the six types of pairing rules.

The full value of these observations is derived for an RS when they include data that has been gathered for its constituent resources, plus the resources that those are dependent upon. In one embodiment, the administrator is not forced to include all dependent resources when defining a Recovery Segment, and even if that were the case, there is nothing that prevents them from deleting various dependent resources. When defining a Recovery Segment, the BR UI provides an option that allows the customer to display the dependency graph for those resources already in the Recovery Segment. This displays the topology from the seed node(s) in the Recovery Segment down to and including the dependent leaf nodes. The purpose of this capability is to give the customer the opportunity to display the dependent nodes and recommend that they be included in the Recovery Segment.

Preparatory and recovery workflows are built by the BR manager to achieve the customer requested RTO policy based on resource operations timings. During active policy monitoring by the BR manager, measurements of achieved time for operations are recorded in observations to the log and used to maintain the running statistical data on operation execution times. Observations written to the log may vary in the contained resource RTO metrics and operation execution timings.

Observations are also collected from of any of the BPEL workflows created by BR in the customer's environment. There is a standard template that each BR BPEL workflow uses. As part of that template, observation data is captured at the start of, during, and at the completion of each workflow. Specifically, in an example, one observation is created at the end of the workflow with data accumulated from completion of each activity. This information is used to gather timings for workflow execution for use in creating subsequent workflows at time of failure.

Figure 9:
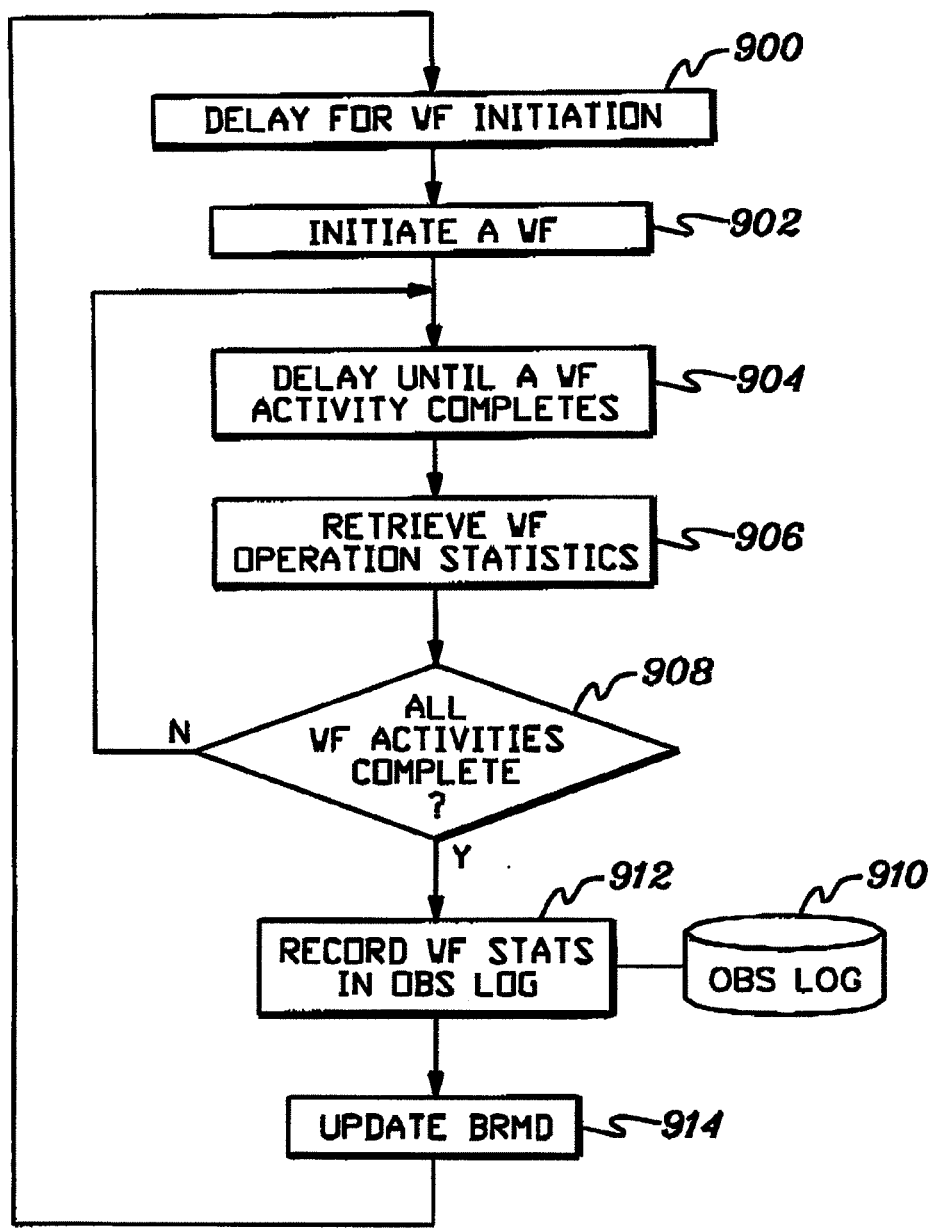
FIG. 9 depicts one embodiment of the logic associated with a workflow monitor used in accordance with an aspect of the present invention.

One embodiment of the logic associated with a workflow monitor is described with reference to FIG. 9. This logic is executed, in one example, by the BRM. BR created workflows include activities to report the operation execution time of activities invoked on BR resources.

As one example, the monitoring process is delayed until a workflow is initiated, STEP 900. In response to initiating a workflow, STEP 902, the monitoring function delays until a workflow activity completes, STEP 904 (e.g., CICS is started, etc.). In response to completion of a workflow activity, statistics regarding the operation execution duration are retrieved, STEP 906, and monitoring continues if there are additional activities to be invoked by the workflow, INQUIRY 908. When all activities associated with the workflow have completed, an observation log 910 that includes the operation execution duration statistics is created, STEP 912. Further, the BR management data for the resources on which operations were invoked is updated, STEP 914, on completion of this invocation of the workflow monitor.

Figure 10:
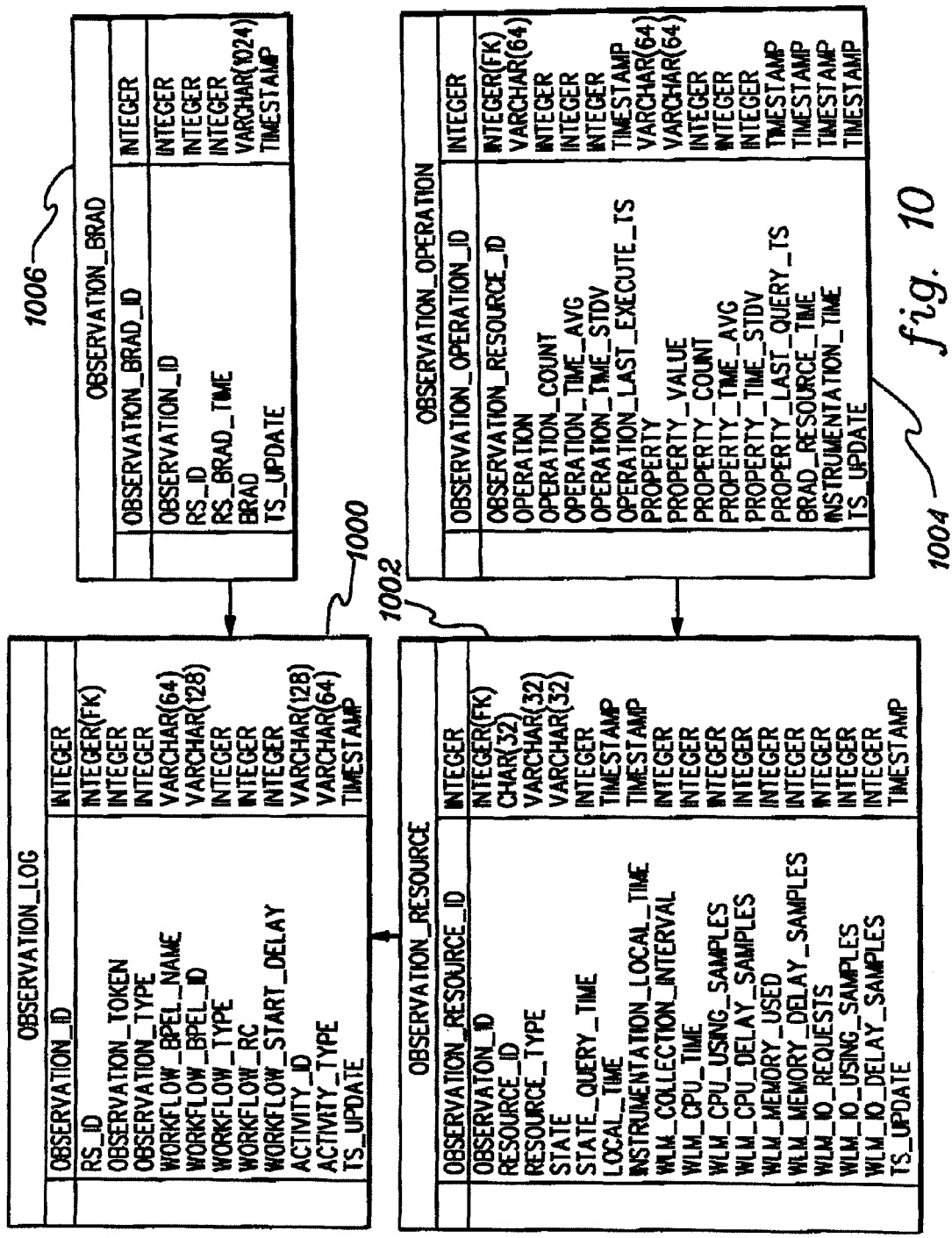
FIG. 10 depicts one example of a physical model of an observation log and related tables, in accordance with an aspect of the present invention.

In one example, the observation log (e.g., 910) used to store the collected data is implemented as one or more DB2® tables in the Business Resilience datastore that physically resides in the BR environment. (DB2® is a registered trademark of International Business Machines Corporation.) That database is created, for instance, at installation time, and the observation log tables are created and initialized (if necessary) at that time. In this example, it is not associated with a particular resource and is not used to persist any resource properties. The typical access mechanism is via JDBC calls from the BR UI client(s) and the RS resource using JDBC type four drivers. One example of the physical model of the observation log (and any other related tables) is depicted in FIG. 10. In FIG. 10, an observation log 1000 is depicted, along with an observation resource table 1002, an observation operation table 1004 and an observation BRAD table 1006. Each table is described in detail in the following sections. The names of the individual data fields, data types, and/or index can vary based on specific implementation of the BR system.

In one embodiment, observation log 1000 includes, for instance, the singleton data values for the observation. Example fields and values within those fields are described below.

| Data Field | Data Type | Description | Keys | Index |
|---|---|---|---|---|
| OBSERVATION_ID | Integer | Generated integer key for uniqueness via a DB2 sequence. Note primary keys in the BR database are a generated integer for compatibility with other non-DB2 databases. | Primary | |
| RS_ID | Integer | Foreign key from the recovery segment table that can be used to retrieve the observations for a particular RS | Foreign | Yes |
| OBSERVATION_TOKEN | Integer | Observation token generated via the Recovery Segment. In the case that the observation records have to be broken up into multiple parts, the Token is used to correlate them into a single "observation" at the UI. | | Yes |
| OBSERVATION_TYPE | Integer | An index into the array of possible observation types: For example:<br>1. Periodic poll<br>2. Workflow begin<br>3. Workflow end<br>4. Activity begin<br>5. Activity end | | Yes |
| WORKFLOW_BPEL_NAME | Varchar(64) | Workflow ID | | |
| WORKFLOW_BPEL_ID | Varchar(128) | | | |
| WORKFLOW_TYPE | Integer | An index into the array of possible workflow types: For example:<br>1. Preparatory<br>2. Preventive<br>3. Undo<br>4. Delta<br>5. Recovery<br>6. Etc. | | |
| WORKFLOW_RC | Integer | Workflow return code from BPEL | | |
| WORKFLOW_START_DELAY | Integer | Delay between when WF is submitted to BPEL to when it actually starts | | |
| ACTIVITY_ID | Varchar(128) | Workflow activity ID | | |
| ACTIVITY_TYPE | Varchar(64) | BPEL workflow type | | |
| TS_UPDATE | Timestamp | Timestamp of initial create or last update and defaults to current timestamp | | |

In one embodiment, observation resource table 1002 includes, for instance, the list of resources in the observation.

| Data Field | Data Type | Description | Keys | Index |
|---|---|---|---|---|
| OBSERVATION_RESOURCE_ID | Integer | Generated integer key for uniqueness via a DB2 sequence. Note primary keys in the BR database are a generated integer for compatibility with other non-DB2 databases. | Primary | |
| OBSERVATION_ID | Integer | Foreign key from the observation table that can be used to retrieve the resources for a particular observation | Foreign | Yes |
| RESOURCE_ID | Char(32) | ResourceID of the resource | | |
| RESOURCE_TYPE | Varchar(32) | May be a resource (e.g., OperatingSystem, BRM) or a database resource (e.g., RG, CR) | | Yes |
| STATE | Varchar(32) | Resource state | | |
| STATE_QUERY_TIME | Integer | Time it took to query the state of the resource | | |
| LOCAL_TIME | Timestamp | Local time where the resource is hosted | | |
| INSTRUMENTATION_LOCAL_TIME | Timestamp | | | |
| WLM_COLLECTION_INTEVAL | Integer | Time interval (in microseconds) for the data collection process. From WLM for z/OS address spaces resource. | | |
| WLM_CPU_TIME | Integer | CPU time (in microseconds) consumed for the address space. From WLM for z/OS address spaces resource. | | |
| WLM_CPU_USING_SAMPLES | Integer | Processor using samples for the address space. From WLM for z/OS address spaces resource. | | |
| WLM_CPU_DELAY_SAMPLES | Integer | Fraction of time dispatchable work in the address space was not running because processors were not available. From WLM for z/OS address spaces resource. | | |
| WLM_MEMORY_USED | Integer | Amount of memory used (in MB). From WLM for z/OS address spaces resource. | | |
| WLM_MEMORY_DELAY_SAMPLES | Integer | Fraction of time dispatchable work in the address space was not running because data was not in memory. From WLM for z/OS address spaces resource. | | |
| WLM_IO_REQUESTS | Integer | Number of I/O requests issued by the address space (start subchannel count). From WLM for z/OS address spaces resource. | | |
| WLM_IO_USING_SAMPLES | Integer | Fraction of time when the work in the system used I/O devices. From WLM for z/OS address spaces resource. | | |
| WLM_IO_DELAY_SAMPLES | Integer | Fraction of time when the work in the address space was delayed because I/O devices or channels were not | | |

-continued

| Data Field | Data Type | Description | Keys | Index |
|---|---|---|---|---|
| | | available. From WLM for z/OS address spaces resource. | | |
| TS_UPDATE | Timestamp | Timestamp of initial create or last update and defaults to current timestamp | | |

In one embodiment, observation operation table 1004 includes, for instance, the list of properties and operations of the resources in the observation.

| Data Field | Data Type | Description | Keys | Index |
|---|---|---|---|---|
| OBSERVATION_OPERATION_ID | Integer | Generated integer key for uniqueness via a DB2 sequence. Note all primary keys in the BR database will be a generated integer for compatibility with other non-DB2 databases. | Primary | |
| OBSERVATION_RESOURCE_ID | Integer | Foreign key from the observation resource table that can be used to retrieve all the properties and operations for a particular resource in the observation | Foreign | |
| OPERATION | Varchar(64) | The operation | | |
| OPERATION_COUNT | Integer | Total number of times that this operation has been executed | | |
| OPERATION_TIME_AVG | Integer | Moving average for time to execute this operation | | |
| OPERATION_TIME_STDV | Integer | Standard deviation of the time to perform this operation | | |
| OPERATION_LAST_EXECUTE_TS | Timestamp | Timestamp of last execution | | |
| PROPERTY | Varchar(64) | The property | | |
| PROPERTY_VALUE | Varchar(64) | Property value at the time of the observation | | |
| PROPERTY_COUNT | Integer | Total number of times that this property has been queried | | |
| PROPERTY_TIME_AVG | Integer | Moving average time to query the property and retrieve the value | | |
| PROPERTY_TIME_STDV | Integer | Standard deviation of the time to query the property and retrieve the value | | |
| PROPERTY_LAST_QUERY_TS | Timestamp | Timestamp of last query | | |
| BRAD_RESOURCE_TIME | Timestamp | Timestamp of the BRAD used to query the resource | | |
| INSTRUMENTATION_TIME | Timestamp | Timestamp of the instrumentation used to query the resource | | |
| TS_UPDATE | Timestamp | Timestamp of initial create or last update and defaults to current timestamp | | |

In one embodiment, observation BRAD table 1006 includes, for instance, the delay time from the RS to each BRAD in the observation.

| Data Field | Data Type | Description | Keys | Index |
|---|---|---|---|---|
| OBSERVATION_BRAD_ID | Integer | Generated integer key for uniqueness via a DB2 sequence. Note primary keys in the BR database are a generated integer for compatibility with other non-DB2 databases. | Primary | |
| OBSERVATION_ID | Integer | Foreign key from the observation log table that can be used to retrieve all the BRAD entries for a observation | Foreign | |
| RS_ID | Integer | Used to retrieve all the RS entries for a particular BRAD | | |
| RS_BRAD_TIME | Integer | The time from the RS to BRAD | | |
| BRAD | Varchar(1024) | The BRAD | | |
| TS_UPDATE | Timestamp | Timestamp of initial create or last update and defaults to current timestamp | | |

Data recorded to the observation log is used by a series of tools (e.g., the BR UI, such as the Eclipse plug-ins, and the cluster analysis tools, such as Mathematica) to build representations of customer IT configurations and perform statistical analysis of operation duration times. Each observation in the log includes a set of RTO metric properties, associated values and operation execution timings for a set of resources. A group of observations is selected, as described below, based on, for instance, a set of categories including time and date, resources included in the IT configuration, level of resource consumption, and/or resource configuration parameters. For each observation and each RTO metric, tooling provides a means, in accordance with an aspect of the present invention, to form clusters that minimize differences in RTO metrics. These clusters are termed "Pattern System Environments" (PSEs).

In particular, in accordance with an aspect of the present invention, a capability is provided for forming (e.g., form, create, build, construct, assemble, etc.) a Pattern System Environment that is a representation of the IT resources of a customer's business environment. The Pattern System Environment is, for instance, automatically formed based on obtained information (e.g., recorded, provided, determined, retrieved, evaluated, had, etc.) associated with IT resources of the customer. This information indicates, for example, how the IT resources are used during a business cycle (i.e., before, during and after business hours) of the customer. Specifically, the information indicates how the one or more IT resources are utilized over time by the customer.

In one example, the PSE can be altered by the customer. Note that not all resources or metrics may appear in a PSE. A customer may choose to modify the number of PSEs identified by the tooling. From the collection of observations that comprise a PSE, statistics are calculated on selected RTO metrics and operation duration times. Statistical analysis on selected RTO metrics and operation duration times yields average, range and standard deviation values.

Observations from the log are used as input to the cluster formation tooling logic. A selection of which observations are to be utilized can be customer tailored. For example, observations within the log may be associated with a customer defined RS—that is all of these observations will have the same collection of constituent resources. Observations in the log, or from a set of merged log(s), may be from multiple RSs either with shared resources or without having shared resources. Observations may also be recorded by the BR manager based on a RS that has been enabled for BR management only for the recording of observations on RTO metrics and operation execution timings.

Customers may or may not know characteristics of their environment on which to base PSE formation by the cluster analysis tooling. As an example, many enterprise customers do know their environment and business processes—based on date and time, based on resources used for a business process, based on utilization of a set of resources and/or based on configuration parameters for resources.

One embodiment of the logic associated with forming a Pattern System Environment is described with reference to FIGS. 11A-11E. In one example, the BRM uses the BR UI interface component (such as the Eclipse plug-ins) and a cluster tooling package (such as Mathematica available through, for instance, Amazon) to form the PSE. The output of the plug-ins is translated to a format acceptable as input to the cluster analysis tool. Similarly, the output of the cluster analysis tool is converted to suitable input for the UI plug-ins. The interaction of the various tools is further described below.

Figure 11A:
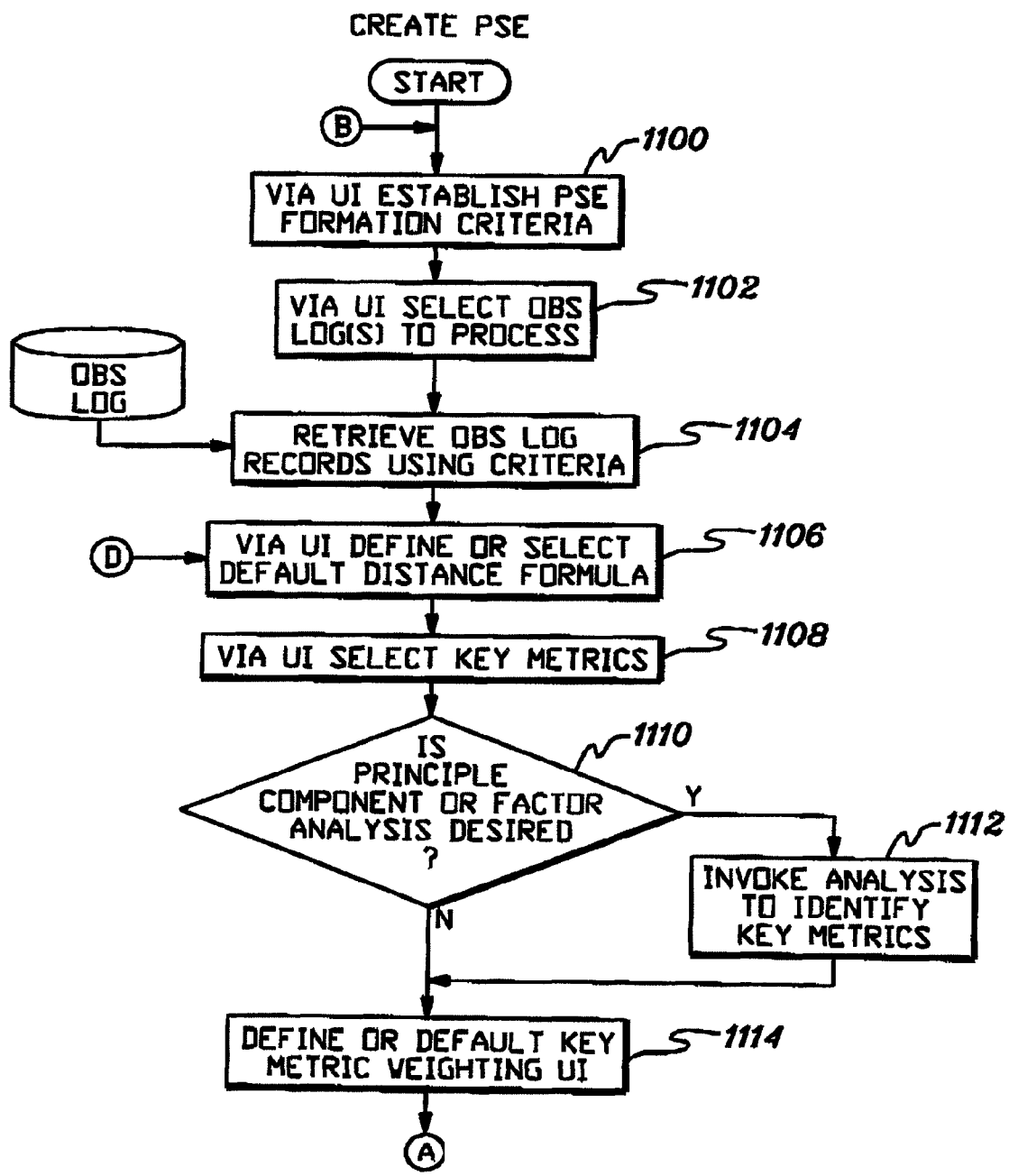
FIGS. 11A-11E depict one embodiment of the logic associated with creating a Pattern System Environment, in accordance with an aspect of the present invention.

Referring to FIG. 11A, initially to form a PSE, PSE formation criteria are established, via, for instance, the UI, STEP 1100. In one example, four recommended criteria may be used. A first criterion includes, for instance, a set of RTO properties including, as examples, time of day, day of week, month or year (as recorded in the observation log record) and allowances for specific holidays which may be industry specific.

A second selection criterion for observations is based on minimizing differences in the collection of resources that form an observation. In one example, this is not viewed as a simple counting of the number of same resources in observations. Instead, support in tooling provides for weighting of the importance to the presence or absence of specified resource instances. The tooling UI provides for customer selection of an observation based on the presence of a resource instance and supports grouping of resource occurrences by type. For example, in a given observation:

The collection of z/OS® instances with resource identity "x", "y", "z".

A specific occurrence of a DB2® subsystem with resource identity "A".

The collection of Windows® Server instances with resource identity "a", "b", "e". (Windows® is a registered trademark of Microsoft Corporation, Redmond, Wash.)

The presence of the replication sessions with resource identity "F".

A specific business application (e.g., CICS application) with resource identity "OLT".

A third criterion for grouping of observations is supported by the tooling based on utilization of resources. Resource utilization metrics associated with a resource, such as z/OS®, within a given observation may include:

CPU usage and delay for resources including DB2, CICS, OSimage.

IO request rate and busy rate.

Memory use and request for memory delay.

Replication session bandwidth usage.

Network bandwidth usage.

Network load balancer counts of requests for connection.

CICS application request rates/degraded.

DB2 request rates—successful/degraded.

Log data quantity/time for CICS or DB2.

The remaining RTO factors in observations from the log form a fourth level of criterion.

Further, via the UI, as an example, one or more observation logs are selected to be processed (e.g., logs for last 30 days, logs of this particular system, etc), STEP 1102, and therefrom, a set of observation log records is selected, STEP 1104. The selection of records may be performed based on PSE formation criteria, customer direction or based on results from principle component analysis or factor analysis routines provided as part of the tooling. Principle component analysis and factor analysis are described in one or more of the following:

Ian T. Jolliffe, *Principal Component Analysis, Published* 2002 Pringer, ISBN0387954422, hereby incorporated herein by reference in its entirety.

http://www.statsoft.com/textbook/stfacan.html

Richard L. Gorsuch, Factor Analysis, 1983, Lawrence Erlbaum Associates, ISBN0-89859-2002-X, hereby incorporated herein by reference in its entirety.

http://www.utexas.edu/cc/docs/stat53.html

In addition to retrieving the log records, default or specific formulas to be used in determining the relative distance between RTO values in observations are specified by the UI, STEP 1106. Additionally, key metrics to be used in cluster analysis may be provided via the UI, STEP 1108, with default values being those used to establish PSE formation criteria.

Thereafter, a determination is made as to whether analysis (e.g., principle component analysis or factor analysis) is desired to determine key metrics to be used in cluster analysis, instead of, or in addition, to those identified above, INQUIRY 1110.

If analysis is desired, then selected data is passed to the tooling to perform the analysis to identify key metrics, STEP 1112. In particular, for some environments, the key characteristics to determine clusters of PSE(s) may not be known before cluster analysis tooling is utilized. Thus, all observations recorded as part of the specified observation log(s) may be selected. For these environments, the tooling supports a form of factor analysis or principle component analysis to determine the critical key metrics that differentiate the observations in the log. This provides for building clusters that minimize the differences in RTO metric values between observations. Subsequent iterations through the PSE creation tooling can be executed to select observation log data based on these critical key metrics. BR developed extensions to tool packages (e.g., Eclipse) suggests seeds for principle component or factor analysis. Some or all of the following seeds may be recommended: groupings based on date and time, groupings based on resources contained in the observation log records, groupings based on resource utilization levels or groupings based on configuration parameters.

Subsequent to identifying the key metrics to be used, either by selection in STEP 1108 or analysis in STEP 1112, weighting is provided for the key metrics, STEP 1114. For example, tooling support for cluster analysis provides support for weighting of key RTO metrics to yield the most distinguished clusters. Weighting factors may be recommended by the tooling from factor analysis or principle component analysis, or recommended by direct customer input. In one particular example:

The most important metric is date/time, so alter date/time to numeric values, where 8 am to 5 pm on Monday through Friday, except holidays, have a value of 1, and 5 pm to 8 am Monday through Friday, except holidays, have a value of 2, and all holidays have a value of 3;

But the next most important distinguishing characteristic is the transaction rate through the CICS1, CICS2 and CICS3 regions. So, the CICS transaction rate metric is assigned a weighting factor of 10;

All other RTO metrics are of much less importance and are assigned a weighting factor of 0.

In another example:

Same as above, but bullet two changes to the following:

The next most important distinguishing characteristic is the transaction rate through CICS as before, but to discount periods where there are slowdowns in CICS processing due to I/O delays, for example, when a backup is being made or when a system is taking a diagnostic dump, the weighting factor for the CICS transaction metric is taken as the actual transaction rate. In times when there is slowdowns in CICS processing, the rate is lower and the weighting of the observation is less.

Figure 11B:
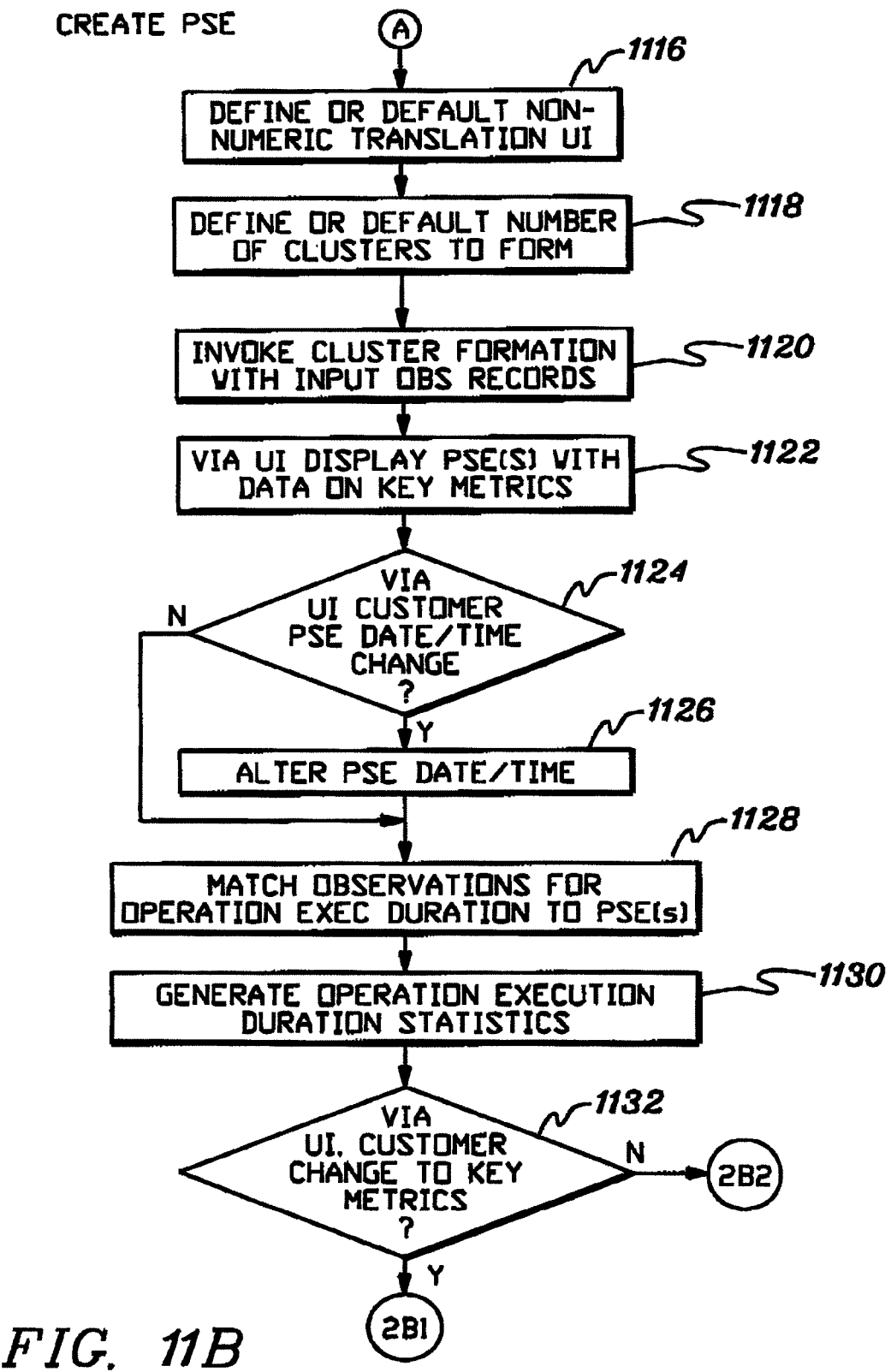

In addition to the above, the tooling provides for conversion of non-numeric values of key metrics to a numeric representation, STEP 1116 (FIG. 11B). The translation may be user defined or a default may be used. An example of such a conversion is setting a true value=1, false=0; a Yes=1, a No=0 (e.g., CLPA=Yes is converted to a 1), etc.

From the selected collection of observations, a number of clusters or Pattern Systems Environments are suggested by the tooling. The number of clusters or Pattern System Environments can be specified by the customer or suggestion of the tooling may be accepted, STEP 1118. Thereafter, cluster formation is invoked with input including the observation log records (i.e., those retrieved in STEP 1104), as well as the key metrics, STEP 1120. Many commercial and open source tool packages are available that accept data, form clusters and provide statistical analysis of the data and clusters formed. These packages include, for instance:

Mathematica cluster analysis:
http://documents.wolfram.com/mathematica/Add-onsLinks/StandardPackages/Statistics/ClusterAnalysis.html SAS offering for cluster analysis:
http://www.sas.com/technologies/analytics/datamining/miner/index.html#screenshot Sysstat software for cluster analysis:
http://www.systat.com/products/Systat/productinfo/?sec=1006

SPSS cluster:
    http://www.spss.com/spss/data_analysis.htm
BMDP statistical software:
    http://www.statsol.ie/bmdp/stats.htm
7$^{th}$ Sense software:
    http://www.seventh-sense-software.com/Chameleon/clustering.htm
R:
    http://freestatistics.altervista.org/reviews/r.php
IDAM Software:
    http://portal.unesco.org/ci/en or
    http://unesco.org/webworld/idams/advguide/TOC.htm After cluster analysis has executed, PSE formation results are displayed with data on key metrics for PSE(s), STEP 1122. Here, the "goodness" of the PSE(s) is displayed. For instance, an indication of how sparse or dense the PSE(s) are is provided.

In creating the PSE, observation records are examined to match the time/date intervals associated with the PSE(s). Time/date intervals for PSE(s) are suggested by the tooling based on the observations associated with the PSE(s) from cluster analysis. Optionally, time/date ranges may be assigned by the customer to the PSE(s). Specifically, in one example, the customer is provided an opportunity to modify the time/date intervals associated with the formed PSE(s), INQUIRY 1124. That is, is the date/time ranges of the records used to build the PSE what is desired or are there holidays or is another time preferred, etc. If it is not what is desired, the customer alters the date/time, STEP 1126.

Subsequent to altering the date/time or if the customer is satisfied with the date/time, operation execution duration times are sorted into the PSE(s) based on the time of operation execution, STEP 1128. In particular, a second pass through the selected observation records is made, and each log record is placed into a PSE based on the recorded operation execution time of the record. This is driven by the date/time ranges of the PSE(s). For instance, an operation execution time for 3 A.M. (i.e., operation occurred at 3 A.M.) is placed in the PSE covering 3 A.M., etc. The operation execution duration time may be different than the time of the observation record having been recorded to the log. Multiple observation records may reflect execution of the same operation which is recognized by the operation execution date/time. Multiple observations for the same operation execution are consolidated into a single event.

From the set of unique operation execution duration measurements in the PSE(s), an average and standard deviation are calculated and stored as part of the PSE(s) to determine the reliability of the measured observations, STEP 1130. The statistics associated with operation execution duration are updated during runtime with measurements of operation execution duration by matching the time/date of operation execution to the time/date associated with the PSE(s) current for a RS.

During the second pass, observation log records are fit to PSE(s) in order to generate statistics for RTO metrics, as described below. By default, the key RTO metrics used in forming the PSE (from cluster analysis tooling) are used to sort observations into PSE(s). Optionally, through the UI interface, customer specification of metrics to be used to fit observations to PSE(s) can be provided by the customer. If the customer wishes to change the selection of the key metrics (e.g., not satisfied with results thus far), INQUIRY 1132, the selection is altered, STEP 1134 (FIG. 11C), and processing continues with STEP 1106 (FIG. 11A).

Figure 11C:
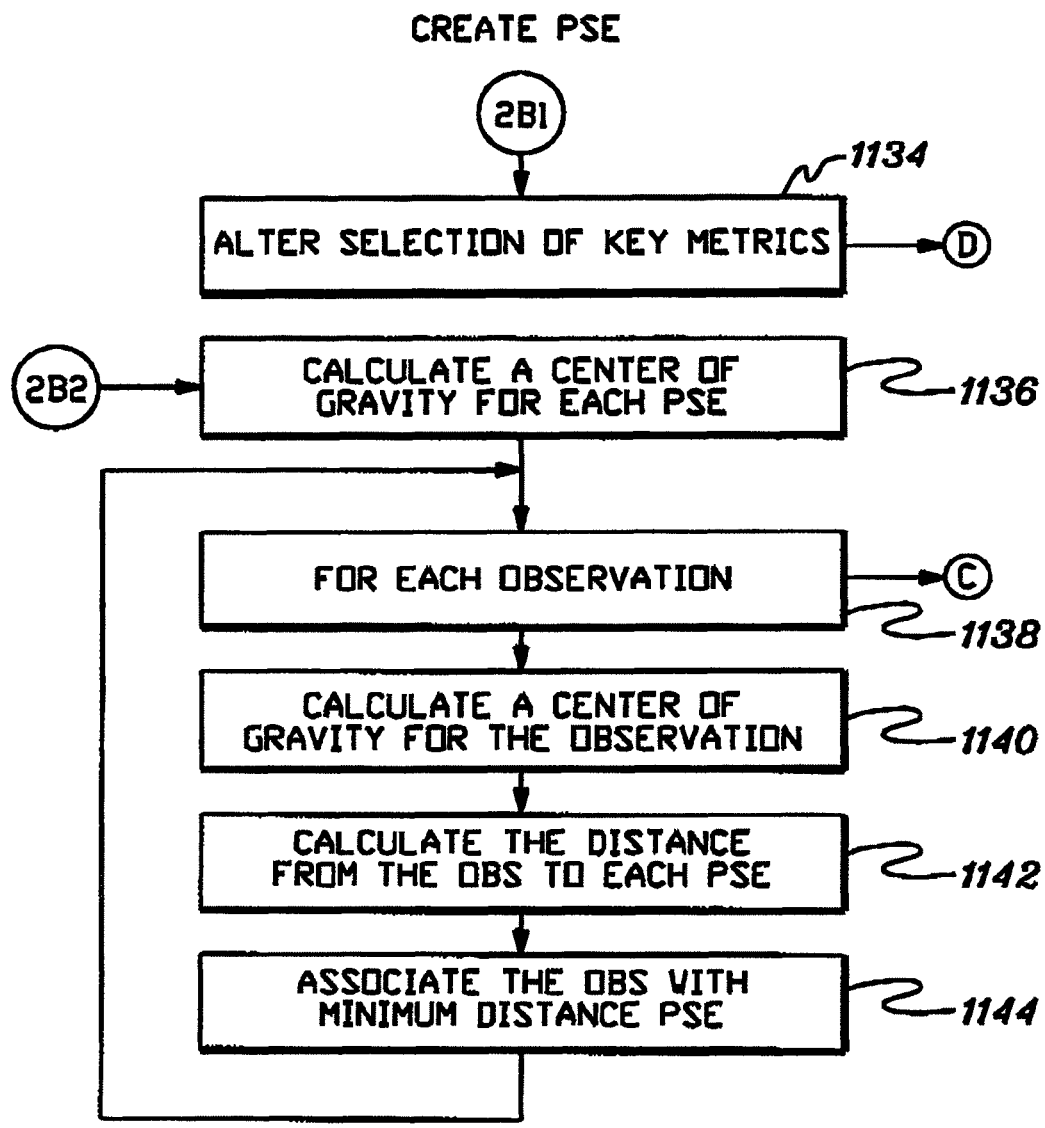

Returning to INQUIRY 1132 (FIG. 11B), if the customer does not wish to change the key metrics, processing continues with finding the best fit for a particular observation (e.g., non-operational date/time observations, such as was CLPA used, number of servers, etc). Initially, to find the best fit, a center of gravity is calculated for each PSE using standard techniques for calculating the center of gravity, STEP 1136 (FIG. 11C). That is, treating the set of key RTO metrics to be an N-dimensional space, a center of gravity is calculated for each PSE. As an example, the average and standard deviation for the operation execution data and non-operational RTO metrics of the observations in the PSE are calculated to determine the center of gravity for the PSE. That is, for the N-dimensional space, the distance from the center of gravity in the N-dimensional space to the average of each key RTO metric forming the N-dimensional space is minimized.

Further, for each selected observation log record, STEP 1138, a center of gravity is calculated, STEP 1140. That is, treating the set of key RTO metrics to be an N-dimensional space, a center of gravity is calculated. As an example, the distance from the center of gravity in the N-dimensional space to each key RTO metric forming the N-dimensional space is minimized. If specified, weights are used to influence calculation of the center of gravity for the PSE(s) and observation log records. Using the default or customer provided distance formula and the calculated centers of gravity, the distance from an observation to each PSE is calculated, STEP 1142. The observation log record is then associated with the PSE for which the distance is minimum, STEP 1144.

Figure 11D:
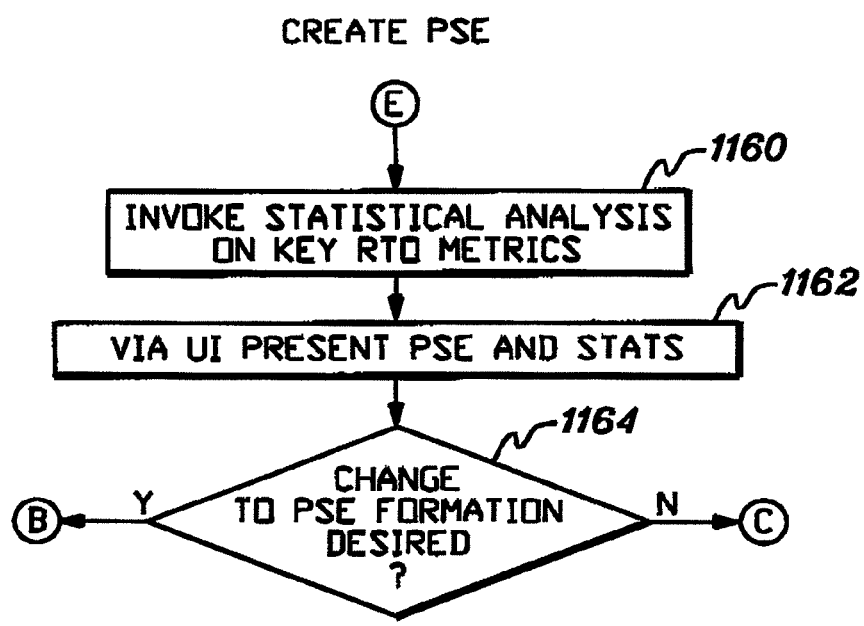

Subsequent to processing each selected observation log record, processing continues with STEP 1160 (FIG. 11D). For example, from the set of observation log records associated with each PSE, statistics for key RTO metrics are calculated including mean and standard deviation, STEP 1160. In response to the tooling forming suggested clusters, visualization of the results are provided, STEP 1162. Visualization of suggested clusters or Pattern System Environments include, for instance, rendering of statistical analysis on individual key RTO metrics and operation execution duration. Metrics reflecting the "goodness" of fit of the observations to the cluster are also provided through calculation of confidence intervals. Through the visualization support, tooling enables customers to merge clusters.

Figure 11E:
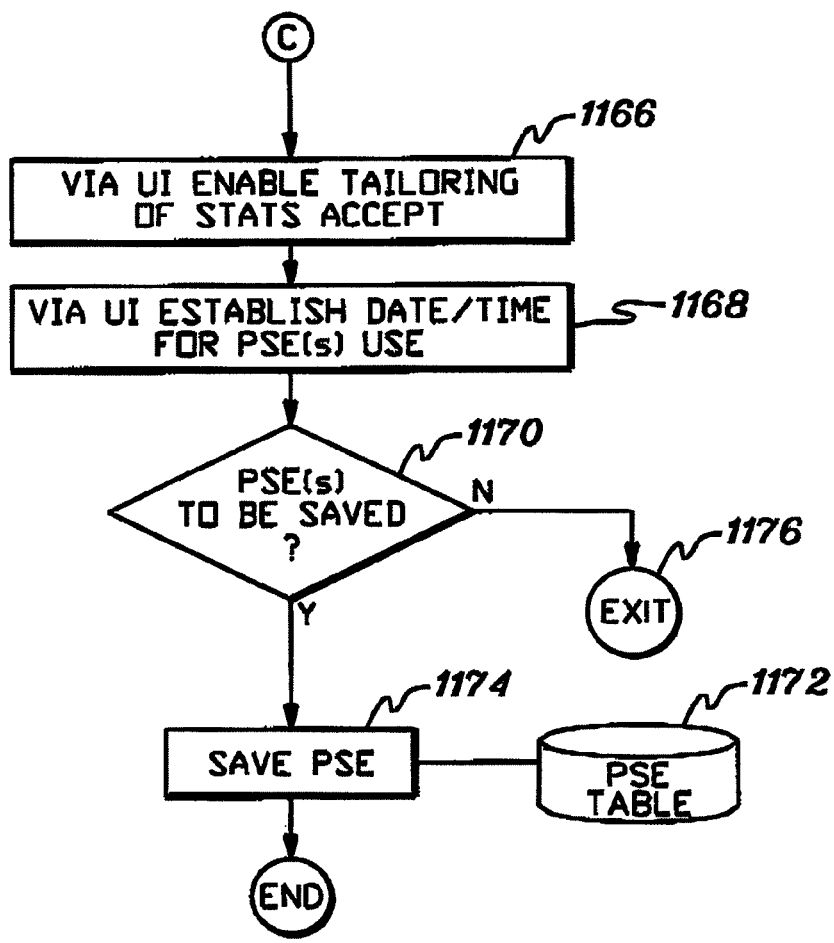

Tooling also provides for iterations enabling customer specified variances in, for instance: specification of the selection criteria for observations to be included in the analysis; weighting for RTO metrics; conversion routines for non-numeric data; statistics on operation execution; enabling BRM use of the operation execution duration time; explicit specification by customer of an operation execution duration time to be used by the BRM; and/or formula for calculating distance between values of RTO metrics between observations. Thus, a determination is made as to whether a change to the PSE formation is desired, INQUIRY 1164. If so, then processing continues with STEP 1100 (FIG. 11A). Otherwise, customer acceptance of formed PSE(s) may be followed by specific customer alteration of statistics generated by tooling, STEP 1166 (FIG. 11E). Customers have the ability to specify the desired level of consistency in the measured values for key RTO metrics.

Additionally, a unique date and time range is associated with PSE use through customer interaction, STEP 1168. Moreover, if the created PSE(s) are to be saved, INQUIRY 1170, relevant PSE table(s) 1172 are created or updated, STEP 1174. However, if the created PSE(s) are not to be saved, INQUIRY 1170, then processing completes without saving the PSE(s) in a PSE table, STEP 1176. This completes processing for creating a Pattern System Environment.

As described above, PSE(s) are built using tooling based on observation records accumulated by BR where the records used may be selected by the customer based on date/time, resources contained in the observation, resource utilization levels and/or various configuration parameters, as examples. Multiple clusters or PSE(s) can be formed by the tooling based on a target number of clusters determined by the tool or specified by the customer. After formation of clusters or PSE(s), the BR administrator can change the PSE(s) by combining clusters or requesting more clusters to be formed. The PSE(s) formed reflect a historical view of how the customer environment defines the periods of date/time for which a given PSE is to apply. Specification of future date/time can be based on the historical date/time used to form the PSE and/or can be based on customer knowledge of business cycles.

A given PSE environment describes the average and standard deviation for key RTO metrics and the average and standard deviation for operation duration. A given PSE environment applies to one or more specific date/time ranges. At any point in time, in this embodiment, there is one PSE environment for a RS that describes the environment current for execution of the business application associated with the RS. There is a PSE associated with the date/time ranges during which the business application associated with the RS may be active.

At any time the RS is actively being monitored, there is one PSE current for that RS. Observations made by BR on key RTO metrics and operation execution duration during runtime are applied to maintain the running average and standard deviation of statistics associated with the one PSE current at the point in time the observation is made. When updating running averages and standard deviation statistics for operation execution duration, the retrieved resource data is evaluated to insure the operation being reported occurred within the current PSE time/date range and multiple observations reporting the same time/date for an operation are consolidated into a single event.

If the BR administrator alters the RS by adding resource operations, observations from the log are selected in tool space based on the same criteria as used in building the original PSE(s) for the RS. Observations for the resource operation being added to the RS are best fit to the existing PSE(s) for the RS. This may be performed non-disruptively. From the observations best fit to a PSE, statistics for key RTO metrics and operating execution duration are calculated. When calculating operating execution duration statistics, the time associated with the operation is used to fit to the set of PSE(s). The time of execution of the operation may differ from the time the observation record was logged. When forming operation duration statistics, observations having the same date/time of operation execution are consolidated into a single event. When the resource is added to the runtime environment for the RS, new observations from the resource are accumulated into the current PSE(s) associated with the RS.

If a resource operation is to be removed from a PSE, it may be removed non-disruptively, if it is not being used in validation. Otherwise, it may be removed disruptively (i.e., stop active monitoring).

Altering the runtime environment definition of PSE(s) adheres to the same set of constraints as applied to the BR administrator build time for PSE(s). There is a set of PSE(s) that apply to the times that the RS is to be actively monitored. The set of PSE(s) does not overlap in date/time of applicability. When a new set of PSE(s) is to be applied to a RS, there are two options: the RS may be stopped from actively monitoring to maintain a policy and the new PSE environment applied to the RS, or the PSE environment can be applied to the runtime RS environment. A change to the PSE environment when the RS is not actively monitoring for policy enforcement occurs through tooling when the BR administrator applies a new set of PSE(s) to the RS. Subsequently, the altered RS may resume active monitoring. Any validated policy is revalidated as the PSE environment may have caused operation execution durations to be different than previously.

To change the PSE environment associated with a RS actively being monitored (i.e., non-disruptively), the BRMD entry associated with each resource in the RS is altered to reflect the new PSE environment. The RS is altered to cause any validated policies to be revalidated. For example, the administrator is notified to revalidate the policies. The policy currently being enforced is revalidated against the new set of PSE(s) based on the new PSE operation execution duration. If the existing policy cannot be validated against the new set of PSE(s), the change in PSE environment cannot be accomplished against the RS while it is actively being monitored. If the current policy can be validated against the new set of PSE(s), a transaction is started, updates to the resource(s) within the RS are made and the transaction commits. Once committed, new observations associated with the RS update the statistics for resource key RTO metrics and operation execution duration associated with the one PSE currently active for the RS.

Tooling for cluster analysis links to other BR services in a variety of ways. BR runtime recognizes when there are sufficient observations to trigger a request for cluster analysis based on defaults or customer adjusted statistical thresholds. BR runtime sends a notification to the BR administrator's mailbox indicating cluster analysis may be desirable. Cluster analysis output is to be appropriate as input to the BR Eclipse plugin. From the cluster analysis output, the BR plugin builds a table for each operation associated with a resource. Each table includes rows representing the PSE and the operation execution duration for that PSE. Operation execution duration is maintained by BR runtime as a running average. Associated with each PSE, BR builds representations of the resource key RTO metrics and associated statistics which are maintained by BR runtime as a set of running averages.

Figure 12:
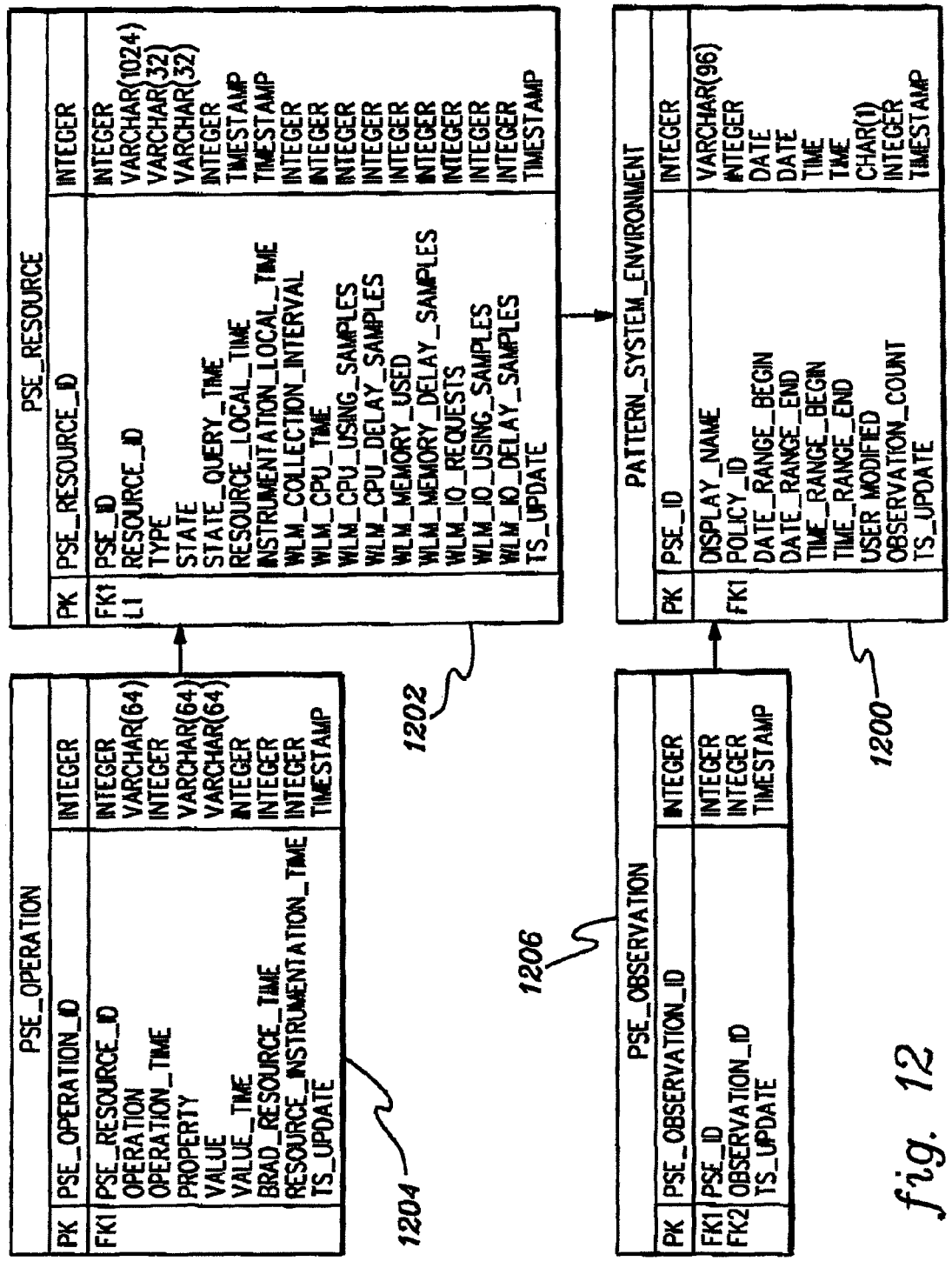
FIG. 12 depicts one embodiment of a physical model of a Pattern System Environment table and related tables, in accordance with an aspect of the present invention.

In one implementation of the BR system, the persistence for the Pattern System Environments is provided and implemented as a number of relational database tables in the BR system datastore that physically resides in the BR environment. That database is created at installation time, and the PSE tables are created and initialized (if necessary) at that time. One typical access mechanism will be via JDBC calls from the BR UI component, as well as from the Recovery Segment, using JDBC type 4 drivers. One example of a physical model of the PSE table (and any other related tables) is depicted in FIG. 12. In FIG. 12, a Pattern System Environment table 1200 is depicted, along with a PSE resource table 1202, a PSE operation table 1204, and a PSE observation table 1206. Each table is described in detail in the following sections. The tables that follow list the datafields, data types, description, keys, and index for one implementation of the BR system. The names of the individual datafields, data types, and/or index can vary based on specific implementation of the BR system.

As an example, Pattern System Environment database table 1200 is used to maintain the set of PSEs that the customers wish to use for policy validation. One embodiment of Pattern System Environment table 1200 is shown below. The field names having an asterisk associated therewith represent the columns that are surfaced as externals of the Recovery Segment.

| Data Field | Data Type | Description | Keys | Index |
|---|---|---|---|---|
| PSE_ID | Integer | Generated integer key for uniqueness via a database sequence. Note primary keys in the BR database are a generated integer for compatibility with other databases. | Primary | |
| *DISPLAY_NAME | Varchar(96) | Name as entered from the BR User Interface component. Display_Name uniqueness for PSEs are enforced by the UI. | User | |
| POLICY_ID | Integer | Foreign key from the policy table that can be used to retrieve the list of PSEs for a given policy | Foreign | |
| *DATE_RANGE_BEGIN | Date | Starting date range for this PSE | | |
| *DATE_RANGE_END | Date | Ending date range for this PSE | | |
| *TIME_RANGE_BEGIN | Time | Starting time range for this PSE | | |
| *TIME_RANGE_END | Time | Ending time range for this PSE | | |
| *USER_MODIFIED | Char(1) | Boolean - has PSE been modified by user | | |
| *OBSERVATION_COUNT | Integer | Number of observations used for Pattern System Environment creation | | |
| TS_UPDATE | Timestamp | Timestamp of initial create or last update and defaults to current timestamp | | |

In one embodiment, PSE RESOURCE table 1202 includes, for instance, the list of IT resources that provide data for the PSE.

| Data Field | Data Type | Description | Keys | Index |
|---|---|---|---|---|
| PSE_RESOURCE_ID | Integer | Generated integer key for uniqueness via a database sequence. Note primary keys in the BR database are a generated integer for compatibility with other databases. | Primary | |
| PSE_ID | Integer | Foreign key from the PSE table that can be used to retrieve all the resources for a particular PSE | Foreign | |
| RESOURCE_ID | Char(32) | ID of the resource | | Yes |
| TYPE | Varchar(32) | IT resource (such as operating system, disk) or BR specific management component (such as RS, RG) | | |
| STATE | Varchar(32) | Resource state | | |
| STATE_QUERY_TIME | Integer | Time it took to query the state of the IT resource | | |
| LOCAL_TIME | Timestamp | Local time where the resource representation resides | | |
| INSTRUMENTATION_LOCAL_TIME | Timestamp | Local time where the detection of resource state resides | | |
| WLM_COLLECTION_INTERVAL | Integer | Time interval (in microseconds) for the data collection process. | | |
| WLM_CPU_TIME | Integer | CPU time (in microseconds) consumed for the address space. | | |
| WLM_CPU_USING_SAMPLES | Integer | Processor using samples for the address space. | | |

| Data Field | Data Type | Description | Keys | Index |
|---|---|---|---|---|
| WLM_CPU_DELAY_SAMPLES | Integer | Fraction of time dispatchable work in the address space was not running because processors were not available. | | |
| WLM_MEMORY_USED | Integer | Amount of memory used (in MB). | | |
| WLM_MEMORY_DELAY_SAMPLES | Integer | Fraction of time dispatchable work in the address space was not running because data was not in memory. | | |
| WLM_IO_REQUESTS | Integer | Number of I/O requests issued by the address space (for example, start subchannel count). | | |
| WLM_IO_USING_SAMPLES | Integer | Fraction of time when the work in the system used I/O devices. | | |
| WLM_IO_DELAY_SAMPLES | Integer | Fraction of time when the work in the address space was delayed because I/O devices or channels were not available. | | |
| TS_UPDATE | Timestamp | Timestamp of initial create or last update and defaults to current timestamp | | |

In one embodiment, PSE Operation table 1204 includes, for instance, the list of properties and operations for the IT resources included in the construction of the PSE.

| Data Field | Data Type | Description | Keys | Index |
|---|---|---|---|---|
| PSE_OPERATION_ID | Integer | Generated integer key for uniqueness via a DB2 sequence. Note all primary keys in the BR database will be a generated integer for compatibility with other non-DB2 databases. | Primary | |
| PSE_RESOURCE_ID | Integer | Foreign key from the PSE resource table that can be used to retrieve all the properties and operations for a particular resource in the PSE | Foreign | |
| OPERATION | Varchar(64) | | | |
| OPERATION_TIME | Integer | Time to execution operation | | |
| PROPERTY | Varchar(64) | | | |
| VALUE | Varchar(64) | | | |
| VALUE_TIME | Integer | Time to query the property and retrieve the value | | |
| BRAD_RESOURCE_TIME | Integer | | | |
| INSTRUMENTATION_TIME | Integer | | | |
| TS_UPDATE | Timestamp | Timestamp of initial create or last update and defaults to current timestamp | | |

As an example, PSE Observation table 1206 is an intersection table used to materialize the many-to-many relationships between a PSE and an observation. An observation can be used to form multiple PSEs, and a PSE has multiple observations. This table maintains the list of observation records that are used to formulate the cluster, and the list of clusters that an observation was used to formulate. One example of the table is shown below.

| Data Field | Data Type | Description | Keys | Index |
|---|---|---|---|---|
| PSE_OBSERVATION_ID | Integer | Generated integer key for uniqueness via a database sequence. Note primary keys in the BR database are a generated integer for compatibility with other databases. | Primary | |
| PSE_ID | Integer | Foreign key from the PSE table that can be used to find the list of observation records used to formulate the cluster | Foreign | |
| OBSERVATION_ID | Integer | Foreign key from the Observation table that can be used to find the list of clusters that an observation was used to formulate | Foreign | |
| TS_UPDATE | Timestamp | Timestamp of initial create or last update and defaults to current timestamp | | |

Policies are defined to a RS, for a given PSE, or a set of PSEs. Policy validation is performed for a set of PSEs, and the information on operation execution timings is managed per PSE. Since, in this embodiment, PSE configuration does not allow gaps or overlaps in PSEs, at any given time, there is one and only one "current PSE" for a given RS. When the current PSE expires, that is called a "PSE boundary". PSE boundaries are detected by a timer that is set for each current PSE. When the timer expires, BR assesses whether there is a policy for which a customer has issued 'Activate' that is targeted to the current PSE. If it finds one, it activates that policy. If BR does not find a policy that is targeted to the new PSE, the RS enters a deact-monitor state where it deactivates, no events are processed, but the prepared environment is left in tact.

For example, a customer may have PSE-A active from 8 am-6 pm, PSE-B from 6:01 pm-1 AM, and PSE-C from 1:01 AM-7:59 AM. If policy-m is for PSE-A and PSE-B, and policy-s is for PSE-C, then on the boundary between PSE-B and PSE-C, there is a deactivation of policy-m and an activation of policy-s. The opposite occurs on the boundary between PSE-C and PSE-A at 8:00 AM.

When a customer defines and validates policies, one specified for multiple PSEs is to be consistent with each other in terms of the prepared environment. Switching to another policy over a PSE boundary, during runtime operations, runs through policy activate, and does not require a re-prepare of the environment. An explicit policy change or topology change may cause a re-prepare, but not a dynamic switch of PSE. BR enforces that at policy validate time of the policies for a given RS, over the set of PSEs that they target.

When a customer activates a policy, BR checks the current PSE with the PSE on the activate request, and fully activates if there is a match. Otherwise, BR accepts the request for activation, and activates when the current PSE matches the target on the policy.

At any given time, for a specific RS, there is one PSE. At any given time for this RS, there is one policy being actively monitored. A single policy can span multiple PSEs, and the customer is not required to have different policies for the various PSEs in a RS.

A process to change the PSEs associated with a RS is also provided. This runs from the UI, where each individual task is its own transaction and committed (or aborted). The following are the set of tasks for this process, in one example:
1. Task1: The RS is deactivated for monitoring, if active. Observation mode is deactivated, if active.
2. Task2: Create PSE is invoked if Admin requests to create new PSES.
3. Task3: Reinitiate observation mode (if deactivated).
Via UI Task list—Task 1.
  * RS Admin State is to be Defined and RSProperty-.ObservationMode is to be off*
  Verify with BR Admin dialog, RS is to be Deactivated for monitoring and observation.
  Invoke RS Deact-for-monitor process.
  Invoke deactivate observation mode for RS process.
Via UI Task list—Task 2
  * PSE(s) is to be defined or selected from the PSETable*
  Read PSETable to retrieve defined PSE(s).
  UI interaction to determine if defined PSE(s) are to be used.
  If PSE definition is desired,
    Invoke Create PSE
Via UI Task list—Task 3
  *If Observation Mode was stopped, reinitiate*
  Invoke Activate Observation Mode process
This completes processing associated with changing a PSE.

In a further example, this processing is performed non-disruptively (i.e., system remains running and actively monitoring).

Described in detail herein is a capability for automatically forming a Pattern System Environment that provides a representation of a customer's business environment. In one example, the Pattern System Environment is used in providing business resiliency for the customer.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 13:
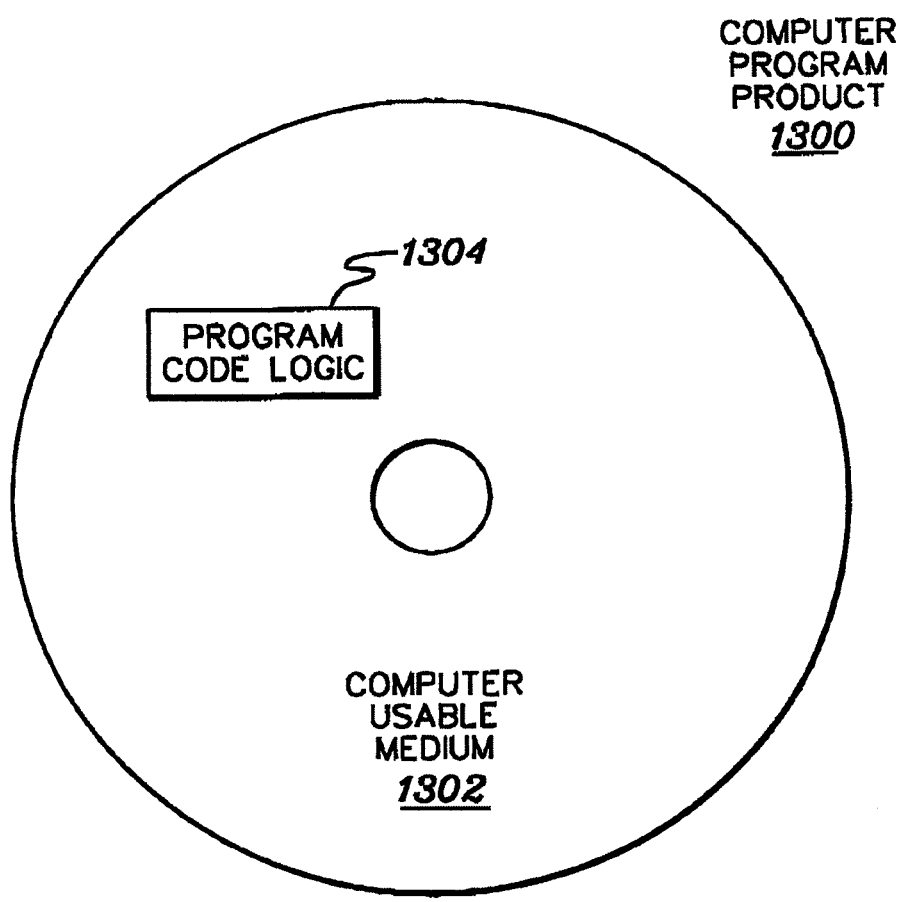
FIG. 13 depicts one embodiment of a computer program product incorporating one or more aspects of the present invention.

One example of an article of manufacture or a computer program product incorporating one or more aspects of the present invention is described with reference to FIG. 13. A computer program product 1300 includes, for instance, one or more computer usable media 1302 to store computer readable program code means or logic 1304 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for automatically forming a Pattern System Environment based on information associated with one or more information technology (IT) resources of a customer. The Pattern System Environment is a representation of the IT resources of the customer's business environment, and the information on which the Pattern System Environment is based indicates how the IT resources are utilized during a business cycle of the customer. Advantageously, the representation is programmatic in that the information is stored in a data structure, which is capable of being searched and revised. Data can be extracted from the data structure.

Although various embodiments are described above, these are only examples. For example, the processing environments described herein are only examples of environments that may incorporate and use a Pattern System Environment and/or one or more other aspects of the present invention. Environments may include other types of processing units or servers or the components in each processing environment may be different than described herein. Each processing environment may include additional, less and/or different components than described herein. Further, the types of central processing units and/or operating systems or other types of components may be different than described herein. Again, these are only provided as examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, although the environments described herein are related to the management of availability of a customer's environment, one or more aspects of the present invention may be used to manage aspects other than or in addition to availability. Further, one or more aspects of the present invention can be used in environments other than a business resiliency environment.

Yet further, many examples are provided herein, and these examples may be revised without departing from the spirit of the present invention. For example, in one embodiment, it is indicated that there is only one active PSE at a time for a RS. In other embodiments, there may be more than one active PSE for a RS. Further, in the tables described herein, there are references to particular products, such as Workload Manager (WLM) or other products offered by International Business Machines Corporation or other companies. These again are only offered as examples, and other products may also be used. Yet further, other clustering and/or analysis tooling products may be employed. Additionally, although tables and databases are described herein, any suitable data structure may be used. There are many other variations that can be included in the description described herein and all of these variations are considered a part of the claimed invention.

Further, for completeness in describing one example of an environment in which a PSE may be utilized, certain components and/or information is described that is not needed for one or more aspects of the present invention. These are not meant to limit the aspects of the present invention in any way.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modification, additions, substitutions and the like can be made without departing from the spirit of the invention and these are therefore considered to be within the scope of the invention as defined in the following claims.

What is claimed is:

1. A method of forming a pattern system environment, said method comprising:
   automatically forming, by a processor, a pattern system environment for a customer of a computing environment, the pattern system environment being a representation of behavior and use of resources during a business cycle of the customer and including how the resources are used during the business cycle of the customer, the forming of the pattern system environment comprising:
   selecting one or more criteria to be used in grouping of observations that form the pattern system environment, wherein the one or more criteria include at least one of: a set of recovery time objective properties; selection of an observation for the pattern system environment based on minimizing differences in a collection of resources that form the observation; or resource utilization metrics associated with a resource;
   selecting one or more observation logs to be processed;
   choosing from the one or more observation logs a set of observation log records, the choosing being based on at least one of the one or more criteria or results from cluster analysis;
   determining a set of metrics to be used in forming the pattern system environment; and
   using the set of observation log records and the set of metrics to form the pattern system environment, the pattern system environment to include one or more observation log records of the set of observation log records.

2. The method of claim 1, further comprising performing weighting of the set of metrics to provide a set of weighted metrics, the set of weighted metrics used to form the pattern system environment.

3. The method of claim 1, further comprising automatically determining a number of pattern system environments to be formed based on the set of observation log records, wherein the pattern system environment formed is one pattern system environment of the number of pattern system environments.

4. The method of claim 1, further comprising:
   generating statistics for the pattern system environment;
   determining based on the statistics whether the set of metrics for the pattern system environment is to be revised; and
   revising the set of metrics based on the determining indicating that the set of metrics is to be revised.

5. The method of claim 1, further comprising determining from the set of observation log records one or more observation log records to be included in the formed pattern system environment, the determining being based on operation execution times of the observation log records, wherein the pattern system environment has a time range associated therewith and the one or more observation log records included in the formed pattern system environment have operation execution times within the time range.

6. The method of claim 5, further comprising determining whether a particular observation log record that is outside the time range is still to be included within the pattern system environment, wherein the particular observation log record is to be included in the pattern system environment based on the pattern system environment being a best fit out of a plurality of pattern system environments for the particular observation log record.

7. The method of claim 6, wherein the determining whether the particular observation log record that is outside the time range is still to be included comprises:
   determining a center of gravity for the pattern system environment;
   determining a center of gravity for the particular observation log record;
   determining, for the particular observation log record, a distance from the particular observation log record to each pattern system environment of the plurality of pattern system environments; and
   based on the distance, determining for the particular observation log record whether the pattern system environment is a best fit for the particular observation log record.

8. The method of claim 7, wherein the determining the center of gravity for the pattern system environment comprises using at least one of: average and standard deviation for operation execution data, and non-operational metric data of the one or more observation log records of the pattern system environment.

9. The method of claim 7, wherein at least one of determining the center of gravity for the pattern system environment or determining the center of gravity for the particular observation log record uses weights in the determining.

10. The method of claim 7, wherein the determining the center of gravity for the particular observation log record uses one or more distance formulas provided in forming of the pattern system environment.

11. The method of claim 1, further comprising using the pattern system environment to manage at least one goal of the business environment of the customer.

12. A system of forming a pattern system environment, said system comprising:
   a memory; and
   a processor in communication with the memory, wherein the system is configured to perform a method, said method comprising:
   automatically forming a pattern system environment for a customer of a computing environment, the pattern system environment being a representation of behavior and use of resources during a business cycle of the customer and including how the resources are used during the business cycle of the customer, the forming of the pattern system environment comprising:
   selecting one or more criteria to be used in grouping of observations that form the pattern system environment, wherein the one or more criteria include at least one of: a set of recovery time objective properties; selection of an observation for the pattern system environment based on minimizing differences in a collection of resources that form the observation; or resource utilization metrics associated with a resource;

selecting one or more observation logs to be processed;

choosing from the one or more observation logs a set of observation log records, the choosing being based on at least one of the one or more criteria or results from cluster analysis;

determining a set of metrics to be used in forming the pattern system environment; and using the set of observation log records and the set of metrics to form the pattern system environment, the pattern system environment to include one or more observation log records of the set of observation log records.

13. The system of claim 12, wherein the method further comprises performing weighting of the set of metrics to provide a set of weighted metrics, the set of weighted metrics used to form the pattern system environment.

14. The system of claim 12, wherein the method further comprises determining from the set of observation log records one or more observation log records to be included in the formed pattern system environment, the determining being based on operation execution times of the observation log records, wherein the pattern system environment has a time range associated therewith and the one or more observation log records included in the formed pattern system environment have operation execution times within the time range.

15. The system of claim 14, wherein the method further comprises determining whether a particular observation log record that is outside the time range is still to be included within the pattern system environment, wherein the particular observation log record is to be included in the pattern system environment based on the pattern system environment being a best fit out of a plurality of pattern system environments for the particular observation log record.

16. The system of claim 15, wherein the determining whether the particular observation log record that is outside the time range is still to be included comprises:

determining a center of gravity for the pattern system environment;

determining a center of gravity for the particular observation log record;

determining, for the particular observation log record, a distance from the particular observation log record to each pattern system environment of the plurality of pattern system environments; and based on the distance, determining for the particular observation log record whether the pattern system environment is a best fit for the particular observation log record.

17. The system of claim 16, wherein the determining the center of gravity for the pattern system environment comprises using at least one of: average and standard deviation for operation execution data, and non-operational metric data of the one or more observation log records of the pattern system environment.

18. A computer program product for forming, a pattern system environment, said computer program product comprising:

a non-transitory computer readable storage medium readable by a processing circuit and storing instructions for execution by the processing circuit for performing a method comprising:

automatically forming, by a processor, a pattern system environment for a customer of a computing environment, the pattern system environment being a representation of behavior and use of resources during a business cycle of the customer and including how the resources are used during the business cycle of the customer, the forming of the pattern system environment comprising:

selecting one or more criteria to be used in grouping of observations that form the pattern system environment, wherein the one or more criteria include at least one of: a set of recovery time objective properties; selection of an observation for the pattern system environment based on minimizing differences in a collection of resources that form the observation; or resource utilization metrics associated with a resource;

selecting one or more observation logs to be processed;

choosing from the one or more observation logs a set of observation log records, the choosing being based on at least one of the one or more criteria or results from cluster analysis;

determining a set of metrics to be used in forming the pattern system environment; and using the set of observation log records and the set of metrics to form the pattern system environment, the pattern system environment to include one or more observation log records of the set of observation log records.

19. The computer program product of claim 18, wherein the method further comprises performing weighting of the set of metrics to provide a set of weighted metrics, the set of weighted metrics used to form the pattern system environment.

20. The computer program product of claim 18, wherein the method further comprises determining from the set of observation log records one or more observation log records to be included in the formed pattern system environment, the determining being based on operation execution times of the observation log records, wherein the pattern system environment has a time range associated therewith and the one or more observation log records included in the formed pattern system environment have operation execution times within the time range.

21. The computer program product of claim 20, wherein the method further comprises determining whether a particular observation log record that is outside the time range is still to be included within the pattern system environment, wherein the particular observation log record is to be included in the pattern system environment based on the pattern system environment being a best fit out of a plurality of pattern system environments for the particular observation log record.

22. The computer program product of claim 21, wherein the determining whether the particular observation log record that is outside the time range is still to be included comprises:

determining a center of gravity for the pattern system environment;

determining a center of gravity for the particular observation log record;

determining, for the particular observation log record, a distance from the particular observation log record to each pattern system environment of the plurality of pattern system environments; and based on the distance, determining for the particular observation log record whether the pattern system environment is a best fit for the particular observation log record.

23. The computer program product of claim 22, wherein the determining the center of gravity for the pattern system environment comprises using at least one of: average and standard deviation for operation execution data, and non-operational metric data of the one or more observation log records of the pattern system environment.

* * * * *